US012748999B2

(12) United States Patent
Zhang et al.

(10) Patent No.: US 12,748,999 B2
(45) Date of Patent: Sep. 29, 2026

(54) EXPECTATION VALUE ESTIMATION METHOD AND APPARATUS IN QUANTUM SYSTEM, DEVICE, AND SYSTEM

(71) Applicants: TENCENT TECHNOLOGY (SHENZHEN) COMPANY LIMITED, Shenzhen (CN); Tsinghua University, Beijing (CN)

(72) Inventors: Shixin Zhang, Shenzhen (CN); Zhouquan Wan, Shenzhen (CN); Shengyu Zhang, Shenzhen (CN); Hong Yao, Shenzhen (CN)

(73) Assignees: TENCENT TECHNOLOGY (SHENZHEN) COMPANY LIMITED, Shenzhen (CN); Tsinghua University, Beijing (CN)

( * ) Notice: Subject to any disclaimer, the term of this patent is extended or adjusted under 35 U.S.C. 154(b) by 787 days.

(21) Appl. No.: 17/993,794

(22) Filed: Nov. 23, 2022

(65) Prior Publication Data

US 2023/0121176 A1 Apr. 20, 2023

Related U.S. Application Data

(63) Continuation of application No. PCT/CN2021/136997, filed on Dec. 10, 2021.

(30) Foreign Application Priority Data

Oct. 14, 2021 (CN) .......................... 202111197696.8

(51) Int. Cl.
*G06N 10/70* (2022.01)
*G06N 10/60* (2022.01)

(52) U.S. Cl.
CPC ............ *G06N 10/70* (2022.01); *G06N 10/60* (2022.01)

(58) Field of Classification Search
CPC ..................................................... G06N 10/70
(Continued)

(56) References Cited

U.S. PATENT DOCUMENTS

2021/0182721 A1 6/2021 Li et al.
2021/0319159 A1* 10/2021 Cowtan .................. G06N 10/60

FOREIGN PATENT DOCUMENTS

CN 112418387 A * 2/2021 ......... G06F 18/2148
CN 112633511 A 4/2021
CN 113379057 A 9/2021

OTHER PUBLICATIONS

VSQL: Variational Shadow Quantum Learning for Classification, Li et al, arxiv, Dec. 15, 2020 (Year: 2020).*

(Continued)

*Primary Examiner* — Austin Hicks
(74) *Attorney, Agent, or Firm* — Anova Law Group, PLLC

(57) ABSTRACT

An expectation value estimation method for a quantum system includes: acquiring an output quantum state of n qubits obtained from an input quantum state of the n qubits through a noisy parameterized quantum circuit (PQC); post-processing the output quantum state of the n qubits by using a neural network to obtain expectation values of a plurality of Pauli strings which are obtained by decomposing a target function; calculating an expectation value of the target function under the output quantum state of the n qubits according to the expectation values of the plurality of Pauli strings; adjusting at least a parameter of the neural network until the expectation value of the target function converges; and acquiring, when the expectation value of the target function satisfies a convergence condition, a convergent expectation value of the target function, the convergent expectation value being an expectation value that satisfies the convergence condition.

20 Claims, 9 Drawing Sheets

(58) Field of Classification Search
USPC ........................................................ 706/17
See application file for complete search history.

(56) References Cited

OTHER PUBLICATIONS

Precise measurement of quantum observables with neural-network estimators, Torlai et al, Jun. 2020 (Year: 2020).*
Quantum error reduction with deep neural network applied at the post-processing stage, Zhukov et al, May 18, 2021 (Year: 2021).*
The World Intellectual Property Organization (WIPO) International Search Report for PCT/CN2021/136997 May 26, 2022 xxxxxx Pages (including translation).
John Preskill, "Quantum Computing in the NISQ era and beyond", Jul. 31, 2018, Quantum.
Alberto Peruzzo et al., "A variational eigenvalue solver on a Photonic quantum processor", Apr. 10, 2013, Commun.
Robert Jastrow, "Many-Body Problem with Strong Forces", Jun. 1, 1955, vol. 98, No. 5, Physical Review.
Guglielmo Mazzola et., "Non-unitary operations for ground-state calculations in near term quantum computers", 2019.
Francesco Benefenati et al., "Improved accuracy on noisy devices by non-unitary Variational Quantum Eigensolver for chemistry applications", Jan. 22, 2021.
Shixin Zhang et al., "Variational Quantum-Neural Hybrid Eigensolver", Jun. 9, 2021.
Ying Li et al., "Efficient variational quantum simulator incorporating active error minimisation", Jun. 19, 2017.
Kristan Temme et al., "Error mitigation for short-depth quantum circuits", Nov. 6, 2017.
B'alint Koczor ., "Exponential Error Suppression for Near-Term Quantum Devices", Sep. 16, 2021.

* cited by examiner

EXPECTATION VALUE ESTIMATION METHOD AND APPARATUS IN QUANTUM SYSTEM, DEVICE, AND SYSTEM

CROSS-REFERENCES TO RELATED APPLICATIONS

This application is a continuation application of PCT Patent Application No. PCT/CN2021/136997 filed on Dec. 10, 2021, which claims priority to Chinese Patent Application No. 202111197696.8, filed on Oct. 14, 2021 and entitled "EXPECTATION VALUE ESTIMATION METHOD AND SYSTEM IN QUANTUM SYSTEM", the entire contents of both of which are incorporated herein by reference.

FIELD OF THE TECHNOLOGY

Embodiments of the present disclosure relate to the field of quantum technology, and in particular, to an expectation value estimation method and apparatus in a quantum system, a device, and a system.

BACKGROUND OF THE DISCLOSURE

At present, a solution of zero-noise extrapolation (ZNE) is provided to achieve quantum error mitigation (QEM). QEM uses some pre-means in a noisy quantum system to mitigate the error caused by the noise, so that the error caused by the noise does not exist in a final result as much as possible.

In the ZNE solution, the same observable is measured under different noise intensities to obtain different expectation values of the observable under different noise intensities; and the obtained expectation values under different noise intensities are extrapolated to the limit of zero noise through the method of polynomial or exponential fitting to obtain an expectation value of the observable under the limit of zero noise as an expectation value of the observable after QEM.

However, in the ZNE solution, expectation value estimation needs to be performed under different noise intensities, so the quantity of measurement of quantum hardware required is several times that of the usual expectation value estimation, resulting in large resource consumption.

SUMMARY

Embodiments of the present disclosure provide an expectation value estimation method and apparatus in a quantum system, a device, and a system. The technical solutions are as follows.

According to an aspect of the embodiments of the present disclosure, an expectation value estimation method in a quantum system is provided, performed by a computer device, the method including: acquiring an output quantum state of n qubits, the output quantum states of the n qubits being obtained by an input quantum state of the n qubits through a noisy parameterized quantum circuit (PQC), n being a positive integer; and performing quantum error mitigation (QEM) on noise of the pqc. Performing the QEM includes: post-processing the output quantum state of the n qubits by using a neural network to obtain expectation values of a plurality of Pauli strings, the plurality of Pauli strings being obtained by decomposing a target function; calculating an expectation value of the target function under the output quantum state of the n qubits according to the expectation values of the plurality of Pauli strings; adjusting a parameter of a target object until the expectation value of the target function converges, the target object comprising the neural network; and acquiring, when the expectation value of the target function satisfies a convergence condition, a convergent expectation value of the target function, the convergent expectation value being an expectation value that satisfies the convergence condition.

According to an aspect of the embodiments of the present disclosure, an expectation value estimation apparatus in a quantum system is provided, including: a state acquisition module, configured to acquire an output quantum state of n qubits, the output quantum states of the n qubits being obtained by an input quantum state of the n qubits through a noisy parameterized quantum circuit (PQC), an expectation value of a target function under the output quantum state of the n qubits being a weighted summation result of expectation values of a plurality of Pauli strings obtained by decomposing the target function, and n being a positive integer; a post-processing module, configured to post-process the output quantum state of the n qubits by using a neural network to obtain the expectation values of the plurality of Pauli strings; an expectation value calculation module, configured to calculate the expectation value of the target function according to the expectation values of the plurality of Pauli strings, the expectation value of the target function being a result of performing quantum error mitigation (QEM) on noise of the pqc through the neural network; a parameter adjustment module, configured to adjust a parameter of a target object until the expectation value of the target function converges, the target object including the neural network; and an expectation value acquisition module, configured to acquire, when the expectation value of the target function satisfies a convergence condition, a convergent expectation value of the target function, the convergent expectation value being an expectation value that satisfies the convergence condition.

According to an aspect of the embodiments of the present disclosure, a computer device is provided. The computer device includes a processor and a memory. The memory stores a computer program. The computer program is loaded and executed by the processor to implement the following method.

According to an aspect of the embodiments of the present disclosure, a non-transitory computer-readable storage medium is provided. The storage medium stores a computer program. The computer program is loaded and executed by a processor to implement the foregoing method.

According to an aspect of the embodiments of the present disclosure, an expectation value estimation system in a quantum system is provided, including: a computer device and a noisy parameterized quantum circuit (PQC), the computer device including a post-processing module and an optimizer module; the PQC being configured to transform an input quantum state of n qubits to obtain an output quantum state of the n qubits, an expectation value of a target function under the output quantum state of the n qubits being a weighted summation result of expectation values of a plurality of Pauli strings obtained by decomposing the target function, and n being a positive integer; the post-processing module being configured to post-process the output quantum state of the n qubits by using a neural network to obtain the expectation values of the plurality of Pauli strings; calculating the expectation value of the target function according to the expectation values of the plurality of Pauli strings, the expectation value of the target function being a result of performing quantum error mitigation (QEM) on noise of the pqc through the neural network; the optimizer module being configured to adjust a parameter of a target object until the expectation value of the target function converges, the target object including the neural network; and acquiring, when the expectation value of the target function satisfies a convergence condition, a convergent expectation value of the target function, the convergent expectation value being an expectation value that satisfies the convergence condition.

The technical solutions provided in the embodiments of the present disclosure may include the following beneficial effects:

By directly performing variational optimization of the neural network on the noisy hardware (including the noisy PQC), the parameter of the neural network can eliminate the influence of quantum noise to a certain extent, achieving the effect of performing QEM on the quantum noise through the neural network, so that the finally obtained expectation value of the target function is the expectation value obtained through QEM. This solution does not require noise simulation without noise, simplifying the training process and reducing the resource consumption.

BRIEF DESCRIPTION OF THE DRAWINGS

To describe the technical solutions in embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other accompanying drawings from these accompanying drawings without creative efforts.

DESCRIPTION OF EMBODIMENTS

Figure 1:
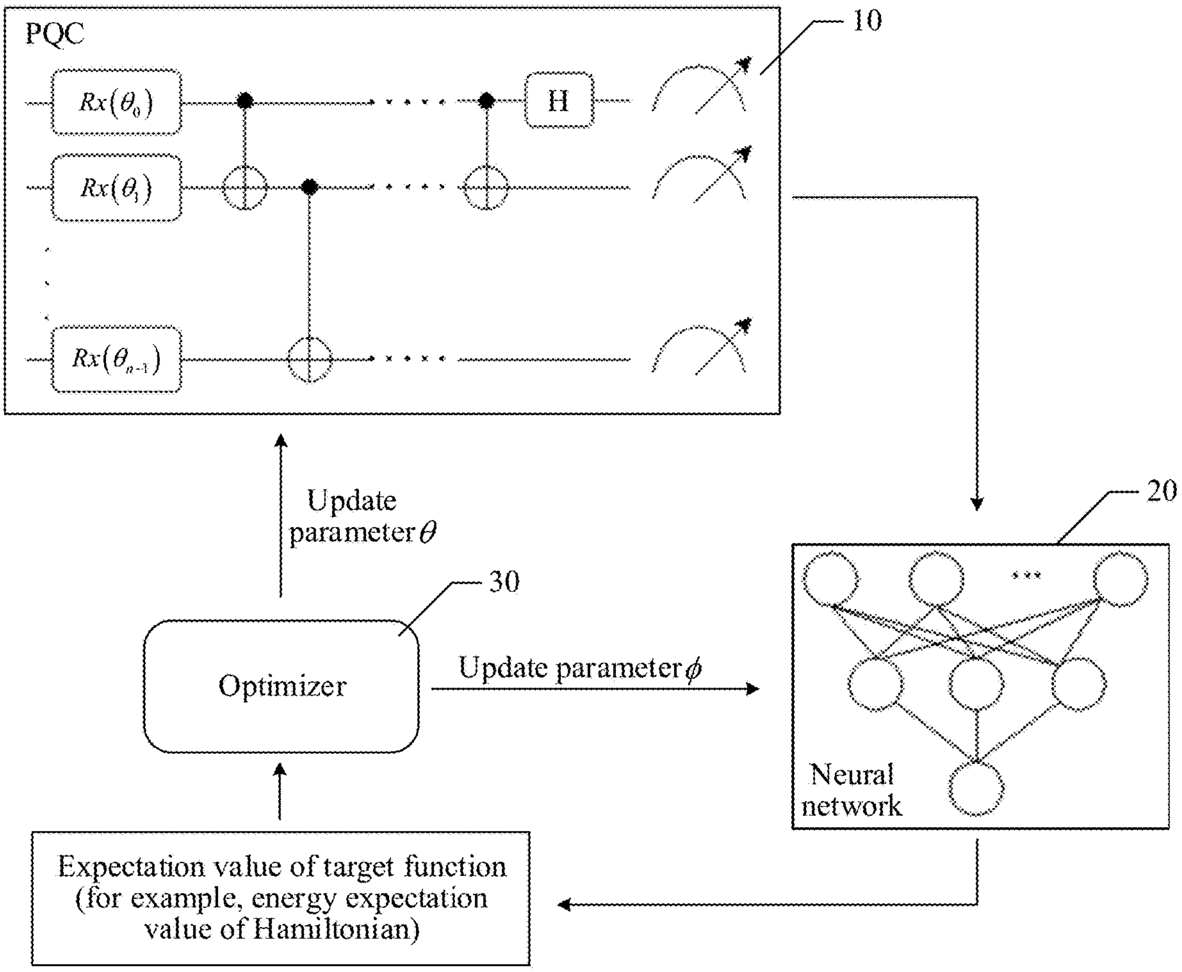
FIG. 1 is a schematic diagram of a VQNHE framework according to an embodiment of the present disclosure.

To make the objectives, technical solutions, and advantages of the present disclosure clearer, the following further describes the implementations of the present disclosure in detail with reference to the accompanying drawings.

Before the technical solutions of the present disclosure are described, some key terms involved in the present disclosure are explained first.

1. Quantum computing: a computing method based on quantum logic, with a basic unit for storing data being a qubit.

2. Qubit: a basic unit for quantum computing. A general computer uses 0 and 1 as basic units of binary. The difference is that the quantum computing can process 0 and 1 at the same time, and the system can be in a linear superposition state $|\psi\rangle=\alpha|0\rangle+\beta|1\rangle$ of 0 and 1, where $\alpha$, $\beta$ represent complex probability amplitudes of the system at 0 and 1. The squares of moduli $|\alpha|^2$, $|\beta|^2$ represent probabilities at 0 and 1 respectively.

3. Quantum circuit: a representation of a universal quantum computer, representing the hardware implementation of a corresponding quantum algorithm/program in a quantum gate model. The quantum circuit including adjustable control quantum gate parameters is referred to as a parameterized quantum circuit (PQC) or a variational quantum circuit (VQC), both of which are the same concept.

4. Hamiltonian: a Hermitian conjugate matrix that describes the total energy of a quantum system. The Hamiltonian, a physical word, is an operator that describes the total energy of a system, usually denoted by H.

5. Eigenstate: For a Hamiltonian matrix H, a solution that satisfies the equation $H|\psi\rangle=E|\psi\rangle$ is referred to as the eigenstate $|\psi\rangle$ of H, with an eigenenergy E. A ground state corresponds to an eigenstate of the lowest energy in a quantum system.

6. Quantum architecture search (QAS): an umbrella term for a series of efforts and solutions that attempt to perform automatic and programmatic search on the architecture, mode, and arrangement of the quantum circuit. The QAS usually adopts the greedy algorithm, reinforcement learning, or genetic algorithm as its core technique. Recently developed techniques include differentiable quantum structure search and predictor-based structure search solutions.

7. Hybrid quantum-classical computing: An inner layer performs calculation by using a quantum circuit (such as PQC) to obtain corresponding physical quantities or loss functions. An outer layer adjusts a computational paradigm of variational parameters of the quantum circuit by using a classical optimizer. Therefore, it can maximize the advantages of quantum computing and is believed to be one of the important directions with the potential to prove quantum advantages.

8. Noisy intermediate-scale quantum (NISQ): The NISQ hardware is the focus of research at the current stage of quantum computing development. At this stage, quantum computing cannot be used as an engine for general-purpose computing due to the limitations of scale and noise. However, for some problems, results that surpass the most powerful classical computers have been achieved, which is often referred to as quantum supremacy or quantum advantage.

9. Quantum error mitigation (QEM): Corresponding to quantum error correction, it is a series of quantum error mitigation and noise suppression solutions with lower resource cost under NISQ era hardware. Compared with full quantum error correction, the resources required are significantly reduced, and it may only be suitable for a specific task, not a general scenario.

10. Variational quantum eigensolver (VQE): The estimation of the ground state energy of a specific quantum system is implemented through a variational circuit (that is, PQC/

VQC). It is a typical hybrid quantum-classical computing paradigm and has a wide range of applications in the field of quantum chemistry.

11. Jastrow factor: a factor commonly used in the variational Monte Carlo wavefunction ansatz, which is used to strengthen the mean-field non-interacting wave function to describe more quantum-associated information. Its basic form is $\hat{P}(\phi)=\exp(\Sigma_{kl}\phi_{kl}Z_kZ_l)$, where $\phi$ is a variational parameter, Z is a quantum operator that gives ±1 eigenvalue on a measurement basis, k and l represent different qubit degrees of freedom, k represents a $k^{th}$ qubit, and l represents an $l^{th}$ qubit.

12. Non-unitary: The so-called unitary matrix includes all matrices that satisfy $U^\dagger U=I$. All evolutionary processes directly allowed by quantum mechanics can be described by unitary matrices. U is a unitary matrix, and $U^\dagger$ is the conjugate transpose of U. In addition, matrices that do not satisfy this condition are non-unitary, which can only be implemented experimentally through auxiliary means or even exponentially more resources. However, the non-unitary matrices tend to have stronger expressiveness and faster ground-state projection. The above "exponentially many resources" means that the demand for resources increases exponentially with the increase of the quantity of qubits. The exponentially more resources may mean that there are exponentially more quantum circuits to be measured, that is, correspondingly, exponentially more computing time is required.

13. Pauli string: a term consisting of the direct product of a plurality of Pauli operators at different lattice points. A general Hamiltonian may usually be decomposed into a sum of a set of Pauli strings. The measurement of VQE is also generally performed term by term according to Pauli string decomposition.

14. Pauli operator: also referred to as the Pauli matrix, which is a set of three 2×2 unitary Hermitian complex matrices (also referred to as unitary matrices), generally represented by the Greek letter σ (Sigma). The Pauli X operator is $$\sigma_x = \begin{bmatrix} 0 & 1 \\ 1 & 0 \end{bmatrix},$$

the Pauli Y operator is $$\sigma_y = \begin{bmatrix} 0 & -i \\ i & 0 \end{bmatrix},$$

and the Pauli Z operator is $$\sigma_z = \begin{bmatrix} 1 & 0 \\ 0 & -1 \end{bmatrix}.$$

15. Bit string: a string of numbers consisting of 0 and 1. The classical results obtained by each measurement of the quantum circuit can be represented by 0 and 1 respectively according to the spin configuration on the measurement basis, so that one total measurement result corresponds to one bit string.

In the technical solutions provided in the present disclosure, by directly performing variational optimization of the neural network on the noisy hardware (including the noisy PQC), the parameter of the neural network can eliminate the influence of quantum noise to a certain extent, achieving the effect of performing QEM on the quantum noise through the neural network, so that the finally obtained expectation value of the target function is the expectation value obtained through QEM. This solution does not require noise simulation without noise, simplifying the training process and reducing the resource consumption.

As shown in FIG. 1, the framework of a variational quantum neural network hybrid eigensolver (VQNHE) provided in an exemplary embodiment of the present disclosure includes a PQC 10, a neural network 20, and an optimizer 30. The neural network 20 and the optimizer 30 may be functional modules deployed in a computer device. The optimizer 30 may also be referred to as an optimizer module. In this embodiment of the present disclosure, the computer device may be a classic computer that executes a computer program through a processor to implement the method, with storage and computing capabilities. The PQC 10 may be noisy. The PQC 10 is configured to transform an input quantum state of n qubits to obtain an output quantum state of the n qubits, n being a positive integer. An expectation value of a target function under the output quantum state of the n qubits is a weighted summation result of expectation values of a plurality of Pauli strings obtained by decomposing the target function. The neural network 20 is configured to post-process the output quantum state of the n qubits. Expectation values of a plurality of Pauli strings are obtained based on a post-processing result of the neural network 20, and then an expectation value of a target function is calculated. The optimizer 30 is configured to adjust a parameter of a target object (including the PQC 10 and/or the neural network 20) until the expectation value of the target function converges. When the expectation value of the target function satisfies a convergence condition, a convergent expectation value of the target function is acquired.

The PQC 10 at the upper left corner of FIG. 1 is consistent with that in an existing VQE framework. The outputted wave function $|\psi\rangle$ is processed by a post-processing operator $\hat{f}=\Sigma_s f_\phi(s)|s\rangle\langle s|$ of the neural network to obtain an enhanced quantum-neural network hybrid wave function: $|\psi_f\rangle=\hat{f_\phi}\,U(\theta)|0\rangle$. The expectation value of the target function corresponding to $|\psi_f\rangle$ may be measured and estimated by the following method: Each Pauli string in the plurality of Pauli strings is measured to obtain a bit string of the output quantum state of the n qubits on a measurement basis corresponding to the Pauli string. Metadata for calculating an expectation value of the Pauli string is outputted through the neural network 20 according to the bit string. Then, the expectation value of the Pauli string is calculated according to the metadata. Finally, weighted summation is performed on the expectation values of the plurality of Pauli strings to obtain the expectation value of the target function. Once the expectation value of the target function is obtained, derivatives of a parameter θ of the PQC 10 and a parameter ϕ of the neural network 20 relative to the expectation value can be calculated by using parameter translation and backpropagation respectively. Through the derivative information, the corresponding parameters can be updated by using the gradient-based optimizer 30 (such as Adam) developed by the classical machine learning community, to complete a round of iteration of quantum-classical hybrid computing paradigm, until the obtained expectation value converges. The expectation value can be used as an approximate estimate of a maximum value or a minimum value of the target function.

In some embodiments, the VQNHE framework may also include a measurement circuit (not shown in FIG. 1). The measurement circuit may include multiple groups of measurement circuits. For example, the quantity of groups of measurement circuits may be equal to the quantity of the Pauli strings obtained by decomposing the target function, so that the multiple groups of measurement circuits are in a one-to-one correspondence with the plurality of Pauli strings. Using a target measurement circuit corresponding to a target Pauli string as an example, the target measurement circuit is configured to perform transformation corresponding to the target Pauli string on the output quantum state of the n qubits to obtain a transformed output quantum state. The neural network 20 is configured to post-process the transformed output quantum state. An energy expectation value of the target Pauli string is obtained based on a post-processing result of the neural network 20. The above operations are performed on the plurality of Pauli strings respectively to obtain expectation values corresponding to the plurality of Pauli strings respectively, and then weighted summation is performed to obtain the expectation value of the target function.

The technical solution provided in the present disclosure is mainly for the QEM solution under the VQNHE framework. The present disclosure provides a solution of adaptive retraining on noisy hardware, so that the parameters of the entire variational framework can eliminate the influence of quantum noise to a certain extent. The effect of this retraining becomes significant after the introduction of a neural network post-processing module. That is, the QEM solution provided in the present disclosure is particularly suitable for the VQNHE framework. This error correction capability shows the noise robustness of the VQNHE framework over ordinary VQE.

For adaptive retraining, the present disclosure provides various different parameter adjustment mechanisms. The method in which the parameter of the PQC and the parameter of the neural network are re-optimized in the noisy hardware is referred to as "joint retraining" in the present disclosure. In addition, the method in which only the parameter of the PQC is adjusted alone and not the parameter of the neural network is referred to as "quantum circuit retraining"; or the method in which only the parameter of the neural network is adjusted alone and not the parameter of the PQC is referred to as "neural network retraining".

In order to measure the QEM capability of different sub-solutions, the present disclosure decreases the expectation value estimation obtained by retraining as an estimation indicator of the QEM capability. Specifically, in the noiseless case, the optimal parameters of the quantum circuit and the neural network are $\theta_0$ and $\phi_0$ respectively. The parameters are loaded in a noisy system to obtain a noisy estimate $E_0$ of the expectation value. Gradient descent optimization is directly performed on the noisy hardware to obtain optimal parameters $\theta$ and $\phi$. In this case, the expectation value estimate is $E_{\theta,\phi}$. Because the optimization is to minimize the expectation value, $E_{\theta,\phi}$ is not greater than $E_0$. In the present disclosure, a retraining energy difference is defined as $\delta E=E_{\theta,\phi}-E_0$. A larger absolute value thereof indicates a stronger QEM error correction capability of the system and a more stable performance on quantum noise.

In addition, for the single quantum circuit retraining, the retraining energy difference is defined as $\delta E=E_\theta-E_0$; and for the single neural network retraining, the retraining energy difference is defined as $\delta E=E_\phi-E_0$.

Although the optimal parameters of the noiseless limit are used in the measurement indicator, in actual experiments, the so-called adaptive "retraining" in the present disclosure can start from any circuit parameters, and it is not necessary to know the a priori knowledge of the optimal parameters of noiseless in advance. That is, the so-called "retraining" is actually the first training. Therefore, the actual operation is to directly perform variational optimization on the noisy quantum hardware. The discussion of performance comparison under the noiseless limit parameters is only to characterize the magnitude of the intrinsic QEM capability, regardless of the workflow required for QEM.

Figure 2:
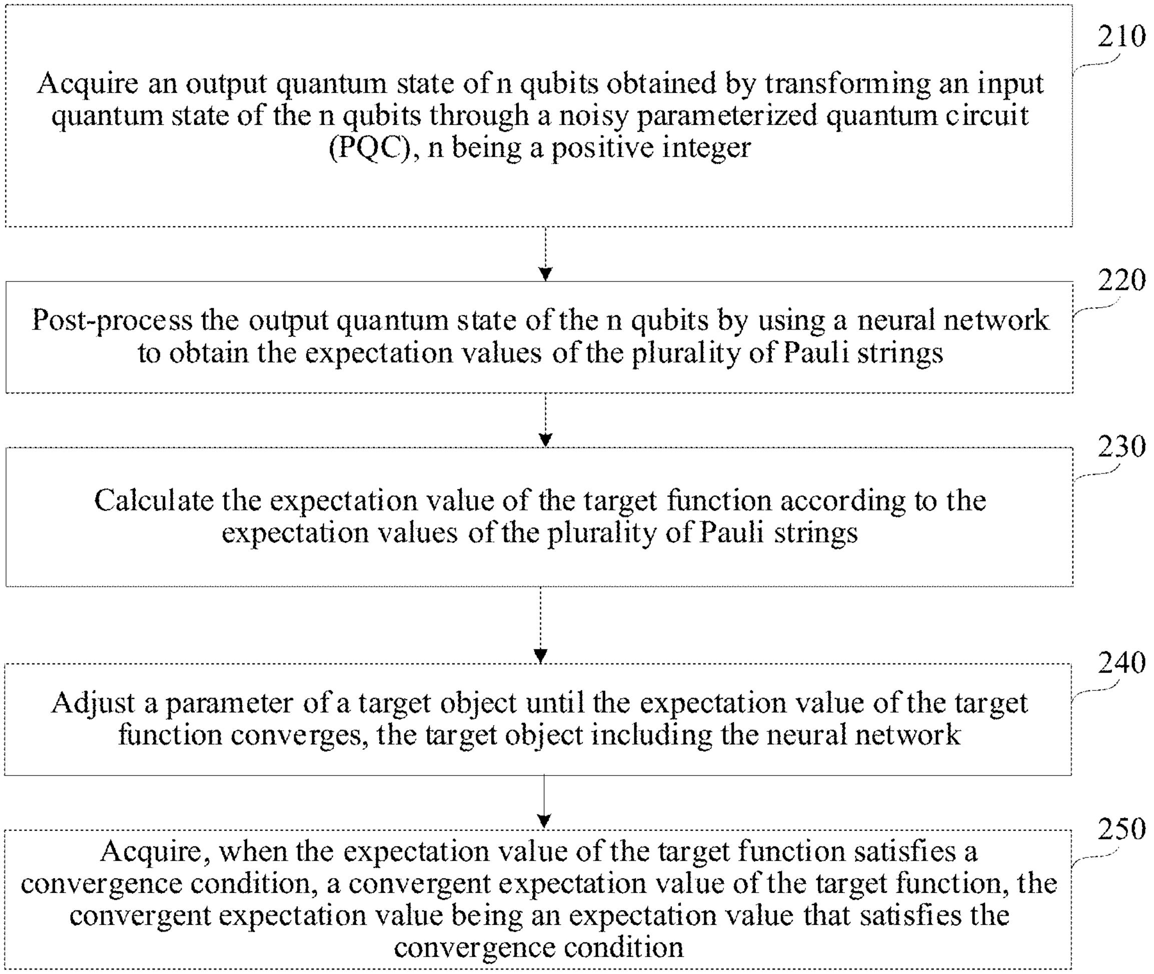
FIG. 2 is a flowchart of an expectation value estimation method in a quantum system according to an embodiment of the present disclosure.

FIG. 2 is a flowchart of an expectation value estimation method in a quantum system according to an embodiment of the present disclosure. The method may be applied in the VQNHE framework introduced above. For example, an execution entity of each step of the method may be a computer device. The method may include the following steps (210-250).

Step 210. Acquire an output quantum state of n qubits, the output quantum states of the n qubits being obtained by an input quantum state of the n qubits through a noisy parameterized quantum circuit (PQC), an expectation value of a target function under the output quantum state of the n qubits being a weighted summation result of expectation values of a plurality of Pauli strings obtained by decomposing the target function, and n being a positive integer.

In this embodiment of the present disclosure, the input quantum state of the n qubits is transformed through the noisy PQC to obtain the output quantum state of the n qubits.

The target function is a function of solving the expectation value by using the VQNHE framework. The target function has a convergent expectation value. The convergent expectation value may be a minimum expectation value of the target function or may be a maximum expectation value of the target function.

In some embodiments, the target function is a Hamiltonian of a target quantum system. An energy expectation value of the Hamiltonian of the target quantum system under the output quantum state of the n qubits is solved, a parameter of the PQC and/or the neural network is adjusted until the energy expectation value satisfies a convergence condition (such as reaching a minimum value), and the energy expectation value that satisfies the convergence condition is determined as a ground state energy of the target quantum system.

The input quantum state of the PQC usually includes an all-0 state, a uniform superposition state, or a Hartree-Fock state. The input quantum state is also referred to as a trial state. The target function may be decomposed into a direct product of a plurality of Pauli strings. For example, the target function may be decomposed into a direct product of k Pauli strings. k is usually an integer greater than 1, but k may be equal to 1 in some special cases. That is, the target function may be regarded as a Pauli string. Therefore, in the VQE framework, the output of the PQC is used to approximate to the output quantum state of the target quantum system. By measuring and estimating the expectation value of the target function of the target quantum system under the output quantum state of the PQC, and continuously optimizing the parameter of the PQC to adjust the output quantum state until the expectation value converges (for example, the expectation value is minimized or maximized), the expectation value of the target function of the target quantum system under the output quantum state tends to converge (for example, the expectation value tends to be minimum or maximum), and the convergent expectation value of the target function is finally obtained.

For example, if target function is a Hamiltonian of the target quantum system, a minimum value of the energy expectation value of the Hamiltonian of the target quantum system under the output quantum state may be solved in the foregoing manners, as the ground state energy of the target quantum system.

As the expectation value of the target function can be a result of performing quantum error mitigation (QEM) on noise of the pqc through the neural network, steps 220 through 250 can be executed to perform quantum error mitigation (QEM) on noise of the pqc.

Step 220. Post-process the output quantum state of the n qubits by using a neural network to obtain the expectation values of the plurality of Pauli strings.

In the VQNHE framework provided in the present disclosure, a wave function outputted by the PQC is post-processed by using the neural network. The neural network can play the role of a general function approximator and has a stronger expression capability and a stronger convergent expectation value approximation capability, which helps improve the accuracy of convergent expectation value estimation.

In some embodiments, step 220 may include: acquiring a measurement result corresponding to the output quantum state of the n qubits, the measurement result including a plurality of bit strings; processing the measurement result through the neural network to obtain an output result of the neural network; and performing calculation based on the output result of the neural network to obtain the expectation values of the plurality of Pauli strings.

For example, assuming that the target function is decomposed to obtain k Pauli strings, k being a positive integer, for a target Pauli string in the k Pauli strings, transformation corresponding to the target Pauli string is performed on the output quantum state of the n qubits by using a measurement circuit corresponding to the target Pauli string, to obtain a transformed output quantum state; a bit string of the transformed output quantum state on a specified measurement basis is obtained through measurement; metadata for calculating an expectation value of the target Pauli string is outputted through the neural network according to the bit string; and the expectation value of the target Pauli string is calculated according to the metadata. In the above manners, after expectation values corresponding to the k Pauli strings respectively are obtained through calculation, the expectation value of the target function may be calculated according to the expectation values corresponding to the k Pauli strings respectively.

In this embodiment of the present disclosure, a specific structure of the neural network is not limited, which may be a simple fully-connected structure or another complex structure. This is not limited in the present disclosure.

Step 230. Calculate the expectation value of the target function according to the expectation values of the plurality of Pauli strings, the expectation value of the target function being a result of performing quantum error mitigation (QEM) on noise of the pqc through the neural network.

In some embodiments, weighted summation is performed on the expectation values of the plurality of Pauli strings according to weight values corresponding to the plurality of Pauli strings respectively to obtain the expectation value of the target function. The weight values corresponding to the plurality of Pauli strings may be set values or may be values updated and optimized synchronously in the process of parameter training of a variational framework. This is not limited in the present disclosure.

In this embodiment of the present disclosure, by directly performing variational optimization of the neural network on the noisy hardware (including the noisy PQC), the parameter of the neural network can eliminate the influence of quantum noise to a certain extent, achieving the effect of performing QEM on the quantum noise through the neural network, so that the finally obtained expectation value of the target function is the expectation value obtained through QEM, which is more accurate.

Step 240. Adjust a parameter of a target object until the expectation value of the target function converges, the target object including the neural network.

For joint retraining, the target object includes the PQC and the neural network. The parameter of the PQC and the parameter of the neural network are adjusted respectively until the expectation value of the target function converges.

For neural network retraining, the target object includes the neural network, but not the PQC. The parameter of the neural network is adjusted until the expectation value of the target function converges.

For quantum circuit retraining, the target object includes the PQC, but not the neural network. The parameter of the PQC is adjusted until the expectation value of the target function converges.

Through experiments, it is found that the convergent expectation value obtained by joint retraining has the highest accuracy, and the convergent expectation value obtained by neural network retraining has the second highest accuracy, while the convergent expectation value obtained by quantum circuit retraining has the accuracy that cannot satisfy the accuracy requirements. For specific experimental data, refer to the description below. Therefore, the present disclosure focuses on the joint retraining and neural network retraining solutions.

For the solution of joint retraining, a derivative of the expectation value of the target function relative to the parameter of the PQC and a derivative of the expectation value of the target function relative to the parameter of the neural network may be calculated respectively. In the present disclosure, to simplify the expression, the derivative of the expectation value of the target function relative to the parameter of the PQC is referred to as a second derivative, and the derivative of the expectation value of the target function relative to the parameter of the neural network is referred to as a third derivative. Then, the parameter of the PQC and the parameter of the neural network are adjusted respectively by gradient descent based on the second derivative and the third derivative, so that the expectation value of the target function converges.

Using the target function being a Hamiltonian of a target quantum system as an example, a derivative of an energy expectation value of the Hamiltonian relative to the parameter of the PQC and a derivative of the energy expectation value of the Hamiltonian relative to the parameter of the neural network are calculated respectively. The parameter of the PQC and the parameter of the neural network are then adjusted respectively by gradient descent based on the derivative information, so that the energy expectation value of the Hamiltonian tends to be minimum.

For the solution of neural network retraining, a derivative of the expectation value of the target function relative to the parameter of the neural network may be calculated. That is, only the second derivative needs to be calculated. Then, the parameter of the neural network is adjusted by gradient descent based on the second derivative, so that the expectation value of the target function converges.

Using the target function being a Hamiltonian of a target quantum system as an example, a derivative of the energy expectation value of the Hamiltonian relative to the parameter of the neural network is calculated. The parameter of the neural network is then adjusted by gradient descent based on the derivative information, so that the energy expectation value of the Hamiltonian tends to be minimum.

The joint retraining solution and the neural network retraining solution have their own advantages. Compared with the neural network retraining solution, the joint retraining solution has higher accuracy, but more complex. Compared with the joint retraining solution, the neural network retraining solution has lower accuracy but lower complexity. However, some other means may be used to improve the accuracy of the neural network retraining solution, which will be described below.

In addition, for the joint retraining solution, the parameter optimization process of the PQC and the parameter optimization process of the neural network may be performed simultaneously or sequentially. This is not limited in the present disclosure.

Step 250. Acquire, when the expectation value of the target function satisfies a convergence condition, a convergent expectation value of the target function, the convergent expectation value being an expectation value that satisfies the convergence condition.

Finally, through multiple times of parameter adjustment, the expectation value of the target function tends to converge. When the expectation value of the target function satisfies the convergence condition, the convergent expectation value of the target function is acquired.

Using the target function being a Hamiltonian of a target quantum system as an example, a minimized energy expectation value of the Hamiltonian is determined as a ground state energy of the target quantum system.

In addition, in this embodiment of the present disclosure, an example in which the target function is the Hamiltonian of the target quantum system is mainly used for description, but any target function with a convergent expectation value may be solved for the expectation value by using the solution provided in the present disclosure. For example, an original Hamiltonian, as the target function, is minimized to obtain a ground state of the system. In this case, the other parts of the energy spectrum corresponding to the Hamiltonian are referred to as excited states. These excited states may be obtained by minimizing the Hamiltonian. That is, the target function is $\langle H^2\rangle - \langle H\rangle^2$, H representing the Hamiltonian of the target quantum system. Mathematically, the target function is always positive. For the excited state of matrix H, the value is 0, which is the minimum value of the target function. Therefore, the excited state of the Hamiltonian H can be obtained by minimizing the target function. After the target function is expanded, it is essentially a sum of a series of Pauli strings, so the practical operation process is exactly the same as the ordinary VQNHE process. The expression of the target function is not limited in the present disclosure.

In the technical solution provided in this embodiment of the present disclosure, by directly performing variational optimization of the neural network on the noisy hardware (including the noisy PQC), the parameter of the neural network can eliminate the influence of quantum noise to a certain extent, achieving the effect of performing QEM on the quantum noise through the neural network, so that the finally obtained expectation value of the target function is the expectation value obtained through QEM. This solution does not require noise simulation without noise, simplifying the training process and reducing the resource consumption.

In real experiments, a large number of quantum circuit runs and measurements are required to accurately estimate small gradients. However, if only neural network retraining is required, there is a very efficient biased alternative solution. Considering that the PQC remains unchanged in neural network retraining, only this circuit is measured N times, and the corresponding measurement results are recorded for the evaluation of the expectation value. Each time the expectation value is calculated, the parameter $\phi$ of the neural network is gradient descent. That is, the same measurement result is inputted to the neural network before and after parameter adjustment of the neural network. This way of retraining is actually biased (biased referring to systematic errors). Because the estimation of the expectation value according to the measurement results obtained from N times of measurements has its own sampling error, further optimizing the neural network according to these fixed measurement results may have an overfitting problem, thereby overestimating the error correction capability of the neural network retraining.

In fact, through running and data analysis on a noisy simulator and real quantum hardware, it is found that the relationship between this biased error correction energy difference $E_{biased}$ and an unbiased intrinsic retraining energy difference $E_{unbiased}$ is $\delta E_{biased}=\delta E_{unbiased}+A/N$, where A is a negative constant related to the Hamiltonian of the system, and N is the number of measurements on the circuit. That is, a larger number N of measurements can well control the systematic error of the biased QEM estimation, which is more friendly than fluctuation scaling of an existing measurement $1/\sqrt{N}$. While the systematic error is controllable, in addition to starting N quantum circuit measurements, this biased retraining requires only the use of classical computing resources, so it is faster and more stable.

In some embodiments, the scaling between QEM capability (retraining energy difference) and noise intensity is studied by using the ground state energy estimation problem of a five-grid transverse-field Ising model. The scaling is a quantitative relationship between two quantities. The corresponding Hamiltonian $\hat{H}$ is as follows:

$$\hat{H} = \sum_{i=1}^{n-1} Z_i Z_{i+1} - \sum_{i=1}^{n} X_i$$

Z represents a Pauli Z operator, X represents a Pauli X operator, n is a positive integer, and i is a positive integer less than or equal to n. The simulated quantum error model is to add a corresponding depolarizing error of intensity p after each dual-bit quantum gate of the PQC. The above quantum error model, which is the simulated noise, is placed after each dual-bit quantum gate of the PQC. This error is most common in the practice and research of quantum circuits, and the transformation of a density matrix is:

$$\rho' = (1-p)\rho + \frac{p}{2^n} I$$

ρ represents the density matrix, ρ' represents a transformed density matrix, p represents an intensity of the depolarizing error, and I is a unit matrix.

Figure 3:
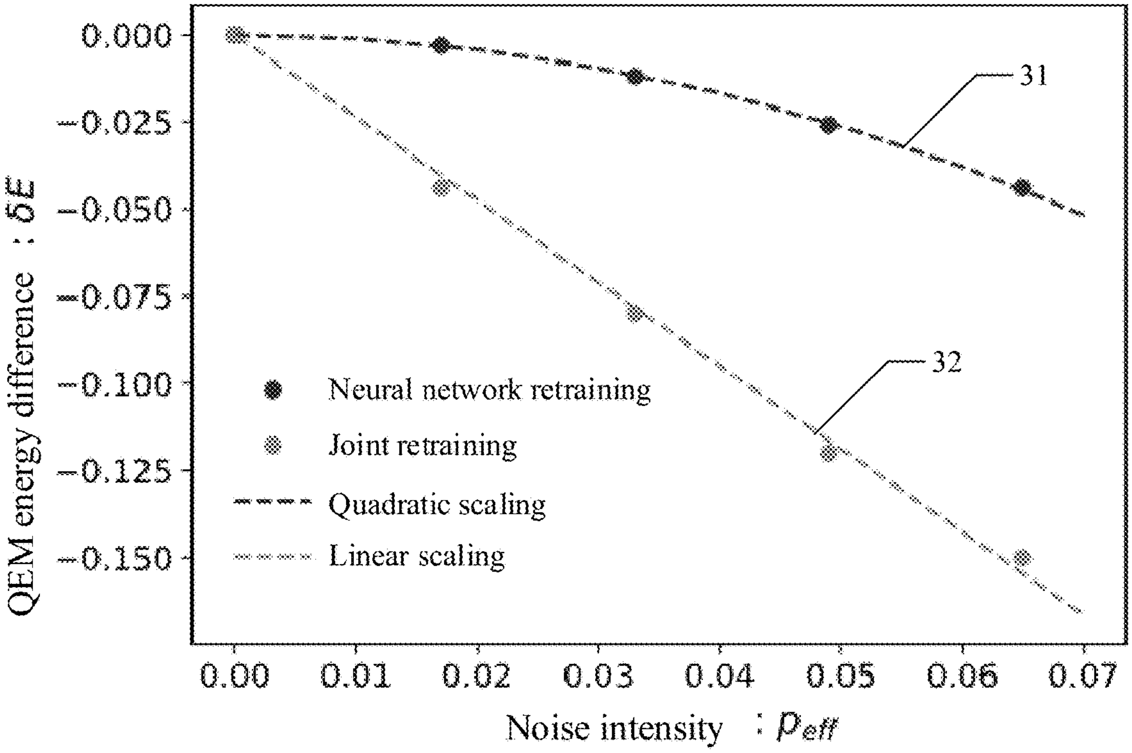
FIG. 3 is a schematic diagram of experimental results of two retraining methods according to an embodiment of the present disclosure.

The corresponding simulation results are shown in FIG. 3. In FIG. 3, the horizontal axis represents an equivalent total noise intensity $p_{eff}$, and the vertical axis represents a QEM energy difference SE. The equivalent total noise intensity $p_{eff}$ is obtained according to the following formula: $1-p_{eff}=E_{noise}/E_{noiseless}$. $E_{noise}$ and $E_{noiseless}$ are the simulation results in a noisy environment and a noiseless environment respectively under the same circuit parameters. In FIG. 3, line 31 shows a result obtained by neural network retraining, and line 32 shows a result obtained by joint retraining with the adjustment of the neural network and the quantum circuit. For neural network retraining, the QEM energy difference is a quadratic function with respect to the noise intensity, that is, $\delta E \propto p^2$. For joint retraining with the adjustment of the parameters of the neural network and the quantum circuit, the QEM energy difference is significantly increased and qualitatively changes, and the scaling changes to linear $\delta E \propto p$. p in the two formulas is $p_{eff}$ above. When the noise intensity is low, retraining of the quantum circuit alone can hardly mitigate the effect of depolarizing noise. That is, the noise resilience presented herein is a unique property of VQNHE, and VQE does not have such good noise resilience. The noise resilience is the robustness of noise, which means that the system is not easily affected by noise, or the effect is very small.

The quadratic scaling of neural network retraining just explains that the difference scale between biased retraining and unbiased retraining obtained in the QEM energy estimation is 1/N. Considering that $p_{eff}$ of the actual system is unknown, it is originally a random variable obtained through measurement and estimation. By definition, it is linear with the measured energy estimate, that is, the standard deviation of $p_{eff}$ is the order of magnitude of $1/\sqrt{N}$, and its variance $\Delta p_{eff} \propto 1/N$, then the QEM energy difference is:

$$\delta E \propto \langle p_{eff}^2 \rangle = \langle p_{eff}^2 \rangle + \Delta p_{eff} = \delta E_{unbiased} + A/N$$

$$\langle p_{eff}^2 \rangle$$

is the expectation of $p_{eff}$ squared estimate, and $\langle p_{eff} \rangle^2$ is the square of the expectation of $p_{eff}$ estimate, which are not the same, and just differ by the variance of $p_{eff}$ estimate. The above formula just explains the scaling of biased retraining with the number N of measurements.

It can be learned from FIG. 3 that the scaling of the QEM capability can be qualitatively different for different retraining mechanisms. The reason for this is analyzed below. It is assumed that the state outputted by the quantum circuit is a strict ground state $\rho_0=|\psi_0\rangle\langle|\psi|$ under ideal conditions, and the corresponding ground state energy is $E_0$. Still considering the depolarized noise model, the output state with noise is $\rho$, and in this case the energy difference of the neural network retraining is $\beta E=E_{QEM}-E_N$. $E_N=E_0(1-p)$ is the noisy energy estimate under ideal parameters. In order to show the scaling, the corresponding terms are Taylor-expanded with respect to the noise intensity:

$$E_{QEM} = E_{QEM}^{(0)} + E_{QEM}^{(1)} p + E_{QEM}^{(2)} p^2 + \dots ,$$

and only the first-order terms are concerned. If it can be shown that the energy difference is 0 up to the first-order terms, then the scaling of the QEM energy difference is at most quadratic. According to:

$$E_{QEM} = \frac{Tr(\hat{f}\rho_0\hat{f}\hat{H})(1-p) + Tr(\hat{f}\hat{H}\hat{f})/2^n}{p + Tr(\hat{f}\rho_0\hat{f})(1-p)}$$

Tr is the product of the matrix, $r_1$ is the number of qubits, $\hat{f}$ is the diagonal matrix of the neural network post-processing, $\hat{H}$ is the Hamiltonian of the system, $\rho_0$ is the quantum ground state without noise, and p is the noise intensity, which is $p_{eff}$ above.

In this case, the zero-order term of the energy difference is significantly 0. For the first-order term, there is $$E_N^{(1)} = -E_0,$$

while assuming that the optimal post-processing module is the adiabatic evolution $f \approx I+pf_1$ in the noiseless case, where $f_1$ is a given constant matrix. Then:

$$E_{QEM}^{(1)} = Tr(f_1\rho_0 H) - E_0 Tr(f_1\rho_0) + Tr(\rho_0 f_1 H) - E_0 Tr(\rho_0 f_1) - E_0$$

$$Tr(f_1\rho_0 H) - E_0 Tr(f_1\rho_0) = \langle\psi_0|Hf_1|\psi_0\rangle - E_0\langle\psi_0|f_1|\psi_0\rangle = 0.$$

$$E_{QEM}^{(1)} = -E_0,$$

that is, the first-order term of the energy difference is also 0. More generally, as long as the noisy solution is assumed to be the adiabatic evolution of the noiseless solution, then the QEM energy difference is at most the quadratic scaling of the noise intensity.

Figure 4:
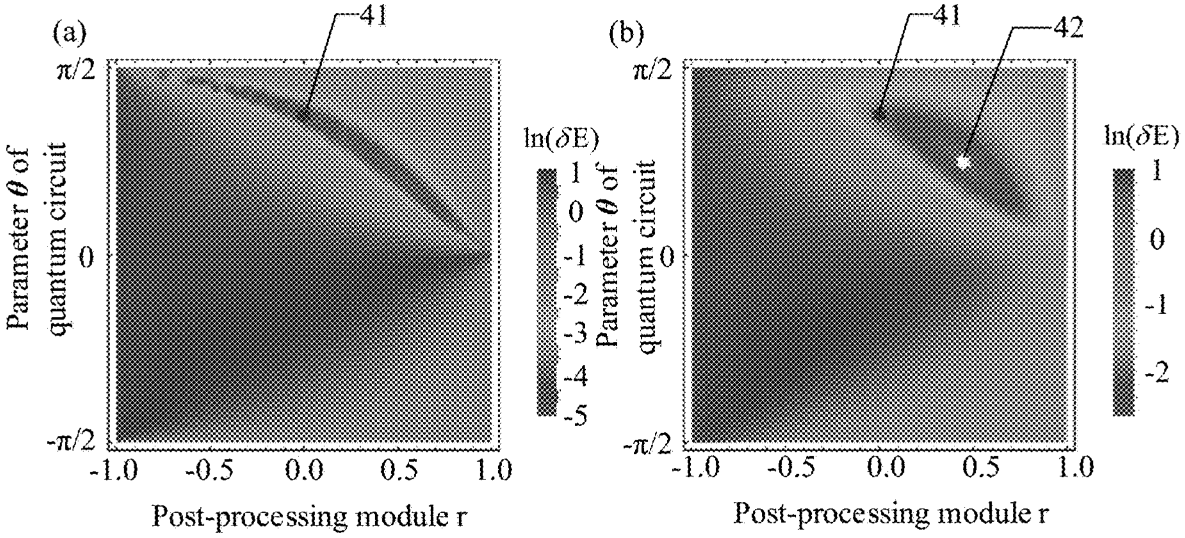
FIG. 4 is a schematic diagram of the least sensitive point to noise in an adiabatic reaction according to an embodiment of the present disclosure.

It is further explained below why joint retraining can lead to the linear scaling of the QEM capability. The key point is that the optimal parameters with noise are not adiabatically connected to the default optimal parameters without noise, that is, the expansion approximation of the post-processing module f with respect to the noise intensity p is not valid. The reason behind this is that if the quantum circuit parameters are allowed to vary, there are infinitely many optimal parameter sets for the noiseless case. Even if the quantum circuit does not directly give the ground state, through a proper non-identity neural network module, VQNHE can still give the strict ground state energy. This case can be seen in panel (a) in FIG. 4. Under such an energy surface, when the noise is turned on, different optimal parameter solutions have different degrees of sensitivity to noise, so the optimal parameter solution that is least sensitive to noise becomes the optimal parameter with noise. In this case, the corresponding solution is not the default solution, and there is no adiabatic approximation connection, so the linear scaling is not 0. This process is similar to symmetry breaking, refer to panel (b) in FIG. 4. Hexagon 41 is the default solution. The hexagon 41 has a fixed abscissa value and can only move up and down the ordinate. For example, in this figure, the abscissa of the hexagon 41 is always r=0, the hexagon 42 is the position of the optimal parameter with noise, r=0 corresponds to an identity post-processing module, and $\theta$ represents a parameter of the quantum circuit.

The noise scales corresponding to the two retraining mechanisms are different because their QEM capabilities are derived from different mechanisms. For neural network retraining, its QEM capability is derived from the adiabatic adaptive evolution of the identity post-processing module. For joint retraining, its QEM is derived from selecting the most noise-resistant combination from an infinite number of equivalent parameter combinations.

By using the biased neural network retraining, while the error is controllable, subsequent iterations no longer process the PQC, and only require classical computing resources. While ensuring the accuracy, the retraining process is simplified, making the retraining more efficient.

Figure 5:
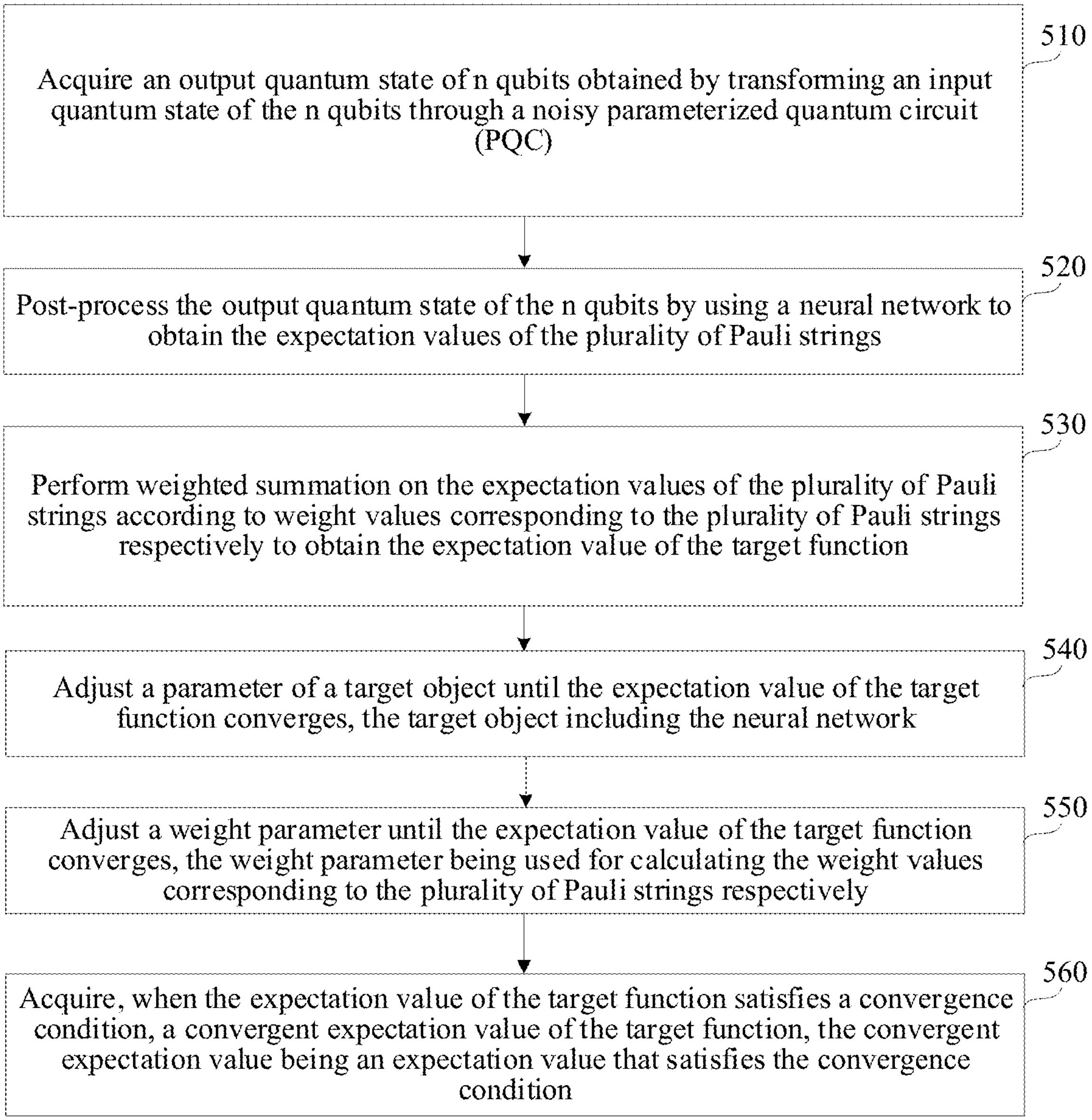
FIG. 5 is a flowchart of an expectation value estimation method in a quantum system according to another embodiment of the present disclosure.

FIG. 5 is a flowchart of an expectation value estimation method in a quantum system according to another embodiment of the present disclosure. The method may be applied in the VQNHE framework shown in FIG. 1. For example, an execution entity of each step of the method may be a computer device. The method may include the following steps (510-560).

Step 510. Acquire an output quantum state of n qubits, the output quantum states of the n qubits being obtained by an input quantum state of the n qubits through a noisy parameterized quantum circuit (PQC), an expectation value of a target function under the output quantum state of the n qubits being a weighted summation result of expectation values of a plurality of Pauli strings obtained by decomposing the target function, and n being a positive integer.

The target function is a function of solving the expectation value by using the VQNHE framework. The target function has a convergent expectation value. The convergent expectation value may be a minimum expectation value of the target function or may be a maximum expectation value of the target function.

In some embodiments, the target function is a parameterized target function, and the parameterized target function is a target function obtained by performing parameter transformation on an original target function, the parameterized target function and the original target function having a same convergent expectation value.

Using the target function being a Hamiltonian of a target quantum system as an example, the parameterized Hamiltonian transformation is introduced to implement triple optimization with stronger expression and error correction capabilities. The triple optimization is to optimize a parameter of the PQC, a parameter of a neural network, and a weight parameter. The reason is that, from the perspective of quantum channel, the post-processing module f is just a diagonal matrix, and the introduction of virtual Hamiltonian transformation is to enhance the capability of classical post-processing quantum channels.

In one embodiment, the parameterized target function is a target function obtained by performing unitary transformation on the original target function.

Using the target function being a Hamiltonian as an example, in the case of unitary transformation, the unitary matrix $\hat{W}$ that is in the same Hilbert space as the system Hamiltonian is introduced, then the expression of the transformed Hamiltonian is $\hat{H}'=\hat{W}^{\dagger}\hat{H}\hat{W}$, where $\hat{W}$ is the unitary matrix, $\hat{H}$ is the Hamiltonian, and $\hat{H}'$ is the transformed Hamiltonian. The transformed Hamiltonian $\hat{H}'$ has the same energy spectrum and ground state as the original Hamiltonian $\hat{H}$. This is ensured by the similarity transformation corresponding to the unitary matrix. In fact, the parameterized transformation W (that is, the unitary matrix $\hat{W}$) may alternatively be non-unitary, and the corresponding non-unitary part may be regarded as being absorbed onto a variational quantum state. Due to the normalization of the denominator, the lower bound of the variational optimization is still the ground state energy. The parameterized transformation W has to satisfy the limitation, so that the transformed Hamiltonian still maintains the Pauli string of the polynomial terms, which is also the key to the efficient and scalable parameterized Hamiltonian transformation method.

In another embodiment, the parameterized target function is a target function obtained by performing non-unitary transformation on the original target function.

Using the target function being a Hamiltonian as an example, in the case of non-unitary transformation, for non-unitary W, it cannot be understood simply by the similarity transformation to ensure that the energy spectrum $\hat{H}$ remains unchanged, but it can still be applied to triple optimization, and the lower bound is still the ground state energy, which is understood as follows. In this case, W is regarded as acting on the output state of VQNHE, as a part of the state. That is, the normalized output state is:

$$\langle \psi^W \rangle = \frac{\hat{W}|\psi_f\rangle}{\left|\hat{W}|\psi_f\rangle\right|}$$

Then, on this state, the corresponding energy expectation of $\hat{H}$ is:

$$\langle \hat{H} \rangle = \frac{\langle 0^n|U^{\dagger}\hat{f}^{\dagger}\hat{W}^{\dagger}\hat{H}\hat{W}\hat{f}U|0^n\rangle}{\langle 0^n|U^{\dagger}\hat{f}^{\dagger}\hat{W}^{\dagger}\hat{W}\hat{f}U|0^n\rangle}$$

That is, the numerator is the expectation of measuring $\hat{W}^{\dagger}\hat{H}\hat{W}$ on the VQNHE output state, and the denominator is the expectation of measuring $\hat{W}^{\dagger}\hat{W}$ on the VQNHE state.

Based on this, the analytical expression of the energy estimate combining VQNHE and parameterized Hamiltonian transformation is:

$$\langle \hat{H} \rangle = Tr\left(\hat{f}_{\phi}\rho_{\theta}\hat{f}_{\phi}^{\dagger}\left(\hat{W}_{\tau}^{\dagger}\hat{H}\hat{W}_{\tau}\right)\right)/Tr\left(\hat{f}_{\phi}\rho_{\theta}\hat{f}_{\phi}^{\dagger}\right) = Tr\left(\left(\hat{W}_{\tau}\hat{f}_{\phi}\right)\rho_{\theta}\left(\hat{W}_{\tau}\hat{f}_{\phi}\right)^{\dagger}\hat{H}\right)/Tr\left(\hat{f}_{\phi}\rho_{\theta}\hat{f}_{\phi}^{\dagger}\right)$$

$\hat{f}$ refers to the diagonal matrix corresponding to neural network post-processing, $\hat{H}$ is the system Hamiltonian, and ρ is the density matrix corresponding to the output state of the PQC. Combined with the parameterized target function, the equivalent post-processing diagonal matrix $\hat{f}$ becomes a more complex $\hat{W}_{\tau}\hat{f}_{\phi}$, enhancing the capability of classical post-processing quantum channels.

In some embodiments, steps 520 through 560 can be executed to perform quantum error mitigation (QEM) on noise of the pqc.

Step 520. Post-process the output quantum state of the n qubits by using a neural network to obtain the expectation values of the plurality of Pauli strings.

In some embodiments, a measurement result corresponding to the output quantum state of the n qubits is acquired, and the measurement result may include a plurality of bit strings; the measurement result is processed through the neural network to obtain an output result of the neural network; and calculation is performed based on the output result of the neural network to obtain the expectation values of the plurality of Pauli strings.

Step 530. Perform weighted summation on the expectation values of the plurality of Pauli strings according to weight values corresponding to the plurality of Pauli strings respectively to obtain the expectation value of the target function, the expectation value of the target function being a result of performing quantum error mitigation (QEM) on noise of the pqc through the neural network.

In this embodiment, the weight value corresponding to each Pauli string is obtained through calculation based on a weight parameter. In the process of iterative optimization, the weight parameter is also iteratively updated, and then the weight value corresponding to each Pauli string calculated correspondingly also changes.

Step 540. Adjust a parameter of a target object until the expectation value of the target function converges, the target object including the neural network.

For joint retraining, the target object includes the PQC and the neural network. The parameter of the PQC and the parameter of the neural network are adjusted respectively until the expectation value of the target function converges.

For neural network retraining, the target object includes the neural network, but not the PQC. The parameter of the neural network is adjusted until the expectation value of the target function converges.

In addition, for the method for adjusting the parameter of the PQC and the parameter of the neural network, refer to the description of the foregoing embodiments. Details are not described herein again.

Step 550. Adjust a weight parameter until the expectation value of the target function converges, the weight parameter being used for calculating the weight values corresponding to the plurality of Pauli strings respectively.

In some embodiments, a first derivative is calculated, the first derivative being a derivative of the expectation value of the target function relative to the weight parameter; and the weight parameter is adjusted by gradient descent based on the first derivative, so that the expectation value of the target function converges.

Using the target function being a Hamiltonian of a target quantum system as an example, a derivative of the energy expectation value of the Hamiltonian relative to the weight parameter. The weight parameter is then adjusted by gradient descent based on the derivative information, so that the energy expectation value of the Hamiltonian tends to be minimum.

Step 560. Acquire, when the expectation value of the target function satisfies a convergence condition, a convergent expectation value of the target function, the convergent expectation value being an expectation value that satisfies the convergence condition.

In this embodiment, in the process of training the neural network, the weight parameter of the Pauli string is adjusted synchronously, so that the convergent expectation value of the target function finally obtained is more accurate, further reducing the error caused by noise. In addition, the parameterized transformation is performed on the target function to obtain the parameterized target function, and it is ensured that the parameterized target function and the original target function have the same convergent expectation value, but the parameterized target function has stronger expression and error correction capabilities than the original target function, thereby further improving the accuracy of the final convergent expectation value.

Figure 6:
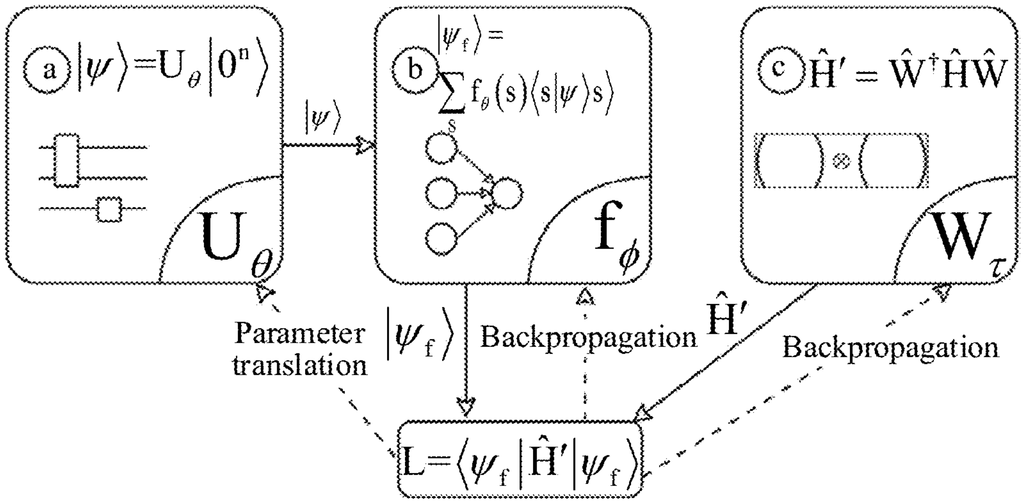
FIG. 6 is a schematic diagram of triple optimization according to an embodiment of the present disclosure.

In some embodiments, FIG. 6 is a schematic diagram of a complete triple optimization framework. Structure a is a part of the PQC, structure b is a part of the neural network, and structure c is a part of the parameterized target function. The parameterized transformation is performed on the original target function to obtain the parameterized target function. The parameterized target function and the original target function have the same convergent expectation value. In the process of iterative optimization of the variational framework, the parameter of the PQC, the parameter of the neural network, and the weight parameter corresponding to the Pauli string are adjusted and optimized until the expectation value of the parameterized target function converges, thereby achieving the triple optimization with stronger expression and error correction capabilities, and substantially reducing the error caused by noisy hardware.

Figure 7:
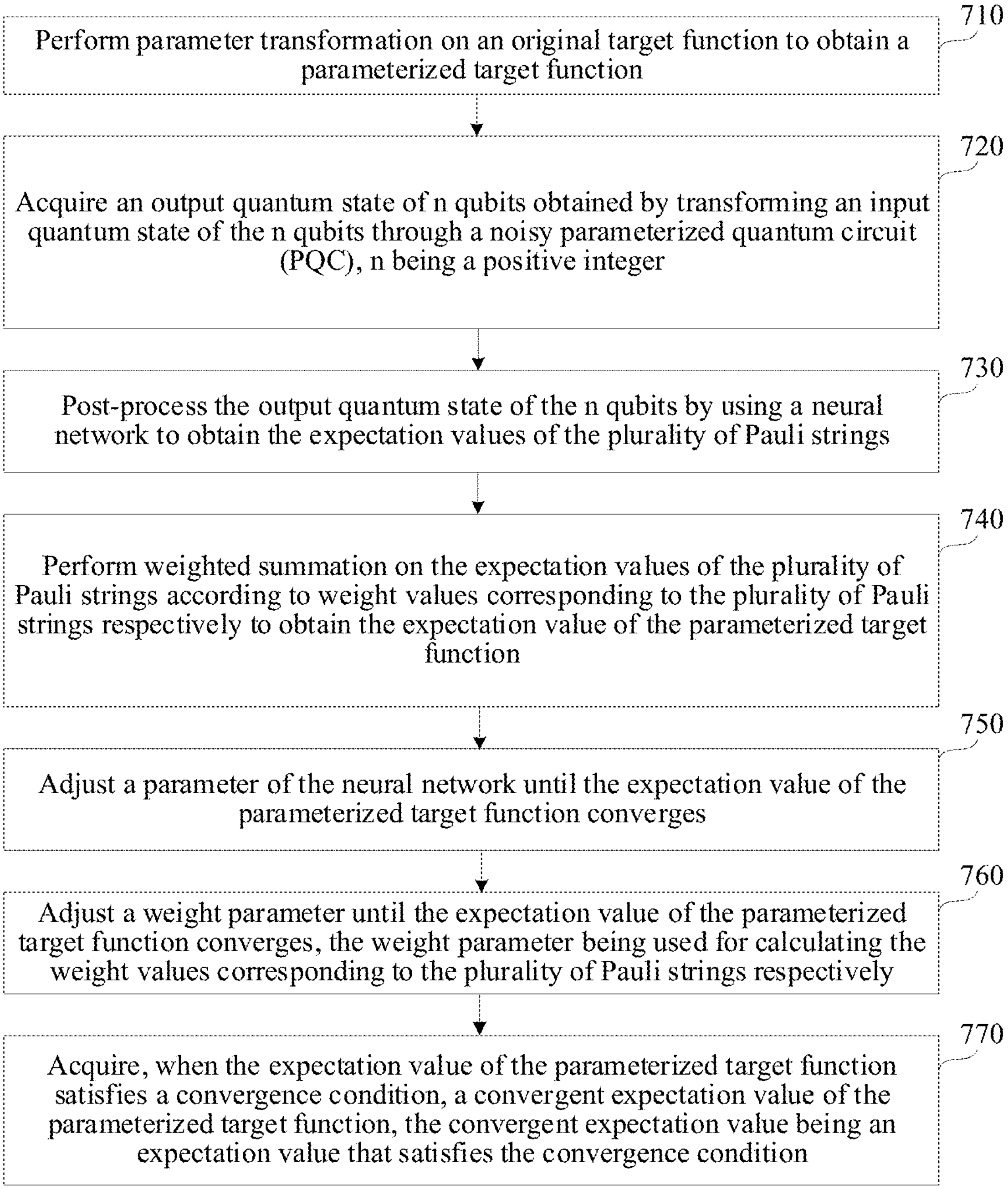
FIG. 7 is a flowchart of an expectation value estimation method in a quantum system according to another embodiment of the present disclosure.

FIG. 7 is a flowchart of an expectation value estimation method in a quantum system according to another embodiment of the present disclosure. The method may be applied in the VQNHE framework shown in FIG. 1. For example, an execution entity of each step of the method may be a computer device. The method may include the following steps (710 to 770):

Step 710. Perform parameter transformation on an original target function to obtain a parameterized target function.

In an example, unitary transformation is performed on the original target function to obtain the parameterized target function. In another example, non-unitary transformation is performed on the original target function to obtain the parameterized target function. The parameterized target function and the original target function have the same convergent expectation value. In addition, the parameterized target function may also be decomposed into a plurality of Pauli strings.

Using the target function being a Hamiltonian of a target quantum system as an example, a unitary matrix that is in the same Hilbert space as the original Hamiltonian may be introduced, and the unitary transformation is performed on the original Hamiltonian by using the unitary matrix to obtain a parameterized Hamiltonian. The parameterized Hamiltonian and the original Hamiltonian have the same energy spectrum and ground state, and the parameterized Hamiltonian still maintains the Pauli string of the polynomial terms.

In some embodiments, steps 720 through 770 can be executed to perform quantum error mitigation (QEM) on noise of the pqc.

Step 720. Acquire an output quantum state of n qubits, the output quantum states of the n qubits being obtained by an input quantum state of the n qubits through a noisy parameterized quantum circuit (PQC), an expectation value of a parameterized target function under the output quantum state of the n qubits being a weighted summation result of expectation values of a plurality of Pauli strings obtained by decomposing the parameterized target function, and n being a positive integer.

In some embodiments, the parameterized target function is decomposed to obtain a plurality of Pauli strings, and then expectation values corresponding to the plurality of Pauli strings are calculated through the VQNHE framework.

Step 730. Post-process the output quantum state of the n qubits by using a neural network to obtain the expectation values of the plurality of Pauli strings.

Step 740. Perform weighted summation on the expectation values of the plurality of Pauli strings according to weight values corresponding to the plurality of Pauli strings respectively to obtain the expectation value of the parameterized target function, the expectation value of the parameterized target function being a result of performing quantum error mitigation (QEM) on noise of the pqc through the neural network.

Step 750. Adjust a parameter of the neural network until the expectation value of the parameterized target function converges.

In some embodiments, the parameter of the neural network is adjusted by using the solution of biased neural network retraining introduced above, that is, only the PQC is measured N times, the corresponding measurement results are recorded, and the corresponding expectation values are calculated. During each iteration, this same set of measurement results is used for neural network post-processing. In this case, the quantity of measurements can be substantially reduced, and the operation process can be simplified.

In some embodiments, the parameter of the PQC and the parameter of the neural network are adjusted respectively until the expectation value of the parameterized target function converges.

Step 760. Adjust a weight parameter until the expectation value of the parameterized target function converges, the weight parameter being used for calculating the weight values corresponding to the plurality of Pauli strings respectively.

Step 770. Acquire, when the expectation value of the parameterized target function satisfies a convergence condition, a convergent expectation value of the parameterized target function, the convergent expectation value being an expectation value that satisfies the convergence condition.

For details not described in this embodiment, reference may be made to the descriptions in the foregoing other embodiments, and details are not described herein again.

In this embodiment, the parameter of the neural network and the weight parameter corresponding to the Pauli string are adjusted, by biased neural network retraining, but the parameter of the PQC that has little effect on the error is not adjusted, which simplifies the training process and reduces the resource consumption, while ensuring the strong error correction capability. In addition, parameterized processing is performed on the target function, so that the convergent value of the target function is closer to the maximum or minimum value.

In an exemplary experiment, the solution of VQNHE framework combining adaptive retraining QEM provided in the present disclosure is applied to a transverse-field Ising model. Considering a one-dimensional transverse-field Ising model with an open boundary and five grids, the target function adopts a Hamiltonian, and the used parameterized Hamiltonian transformation is the rotation of a single point. That is:

$$\hat{W} = \prod_i \exp i\tau_i Y_i$$

The corresponding transformed Hamiltonian still has only polynomial terms:

$$\hat{H}'_\tau = \sum_i (\cos 2\tau_i \cos 2\tau_{i+1} Z_i Z_{i+1} + \sin 2\tau_i \sin 2\tau_{i+1} X_i X_{i+1} - \sin 2\tau_i \sin 2\tau_{i+1} X_i Z_{i+1} - \cos 2\tau_i \sin 2\tau_i Z_i X_{i+1} - \cos 2\tau_i X_i - \sin 2\tau_i Z_i)$$

Z and X represent Pauli operators, $\tau_i$ and $\tau_{i+1}$ represent weight parameters, and the term in front of the Pauli string represents the weight value corresponding to each Pauli string calculated based on the weight parameter.

Figure 8:
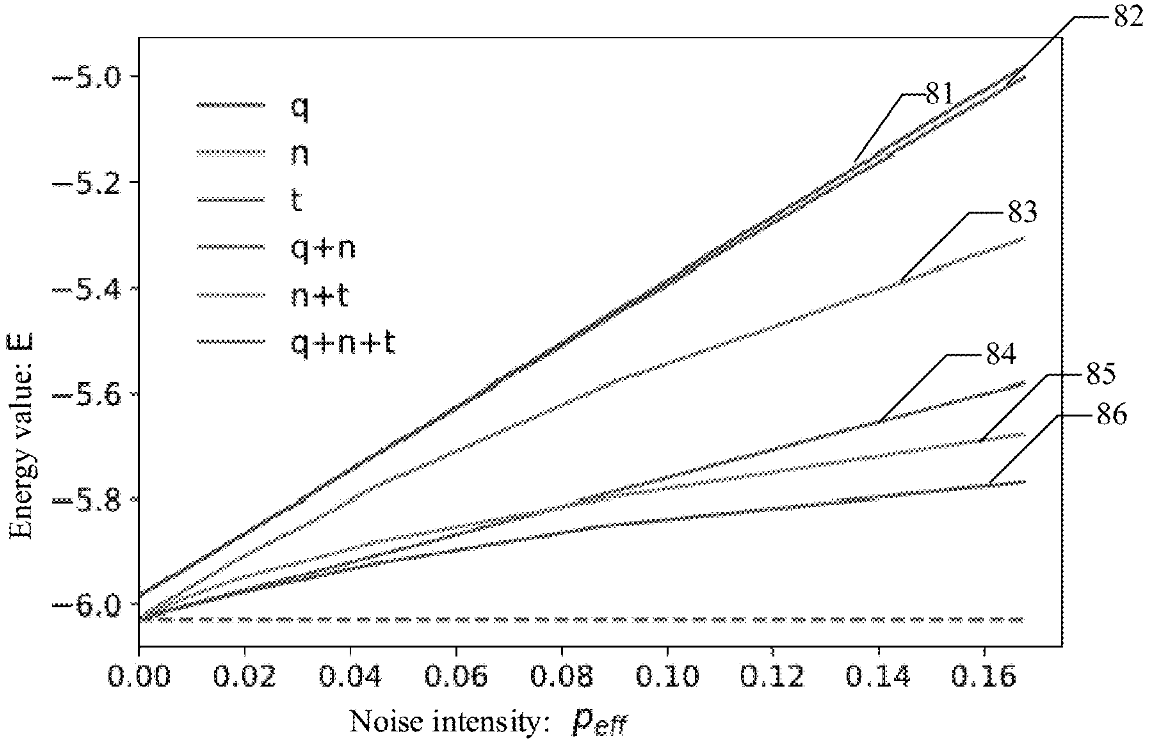
FIG. 8 is a schematic diagram of experimental results according to an embodiment of the present disclosure.

Considering the addition of depolarizing noise after the dual-bit gate, the corresponding experimental results for different retraining solutions are shown in FIG. 8.

In FIG. 8, q, n, and t represent the PQC, the neural network, and the weight parameter respectively. In FIG. 8, line 81 represents an experimental result of adjusting only the weight parameter, that is, t; line 82 represents an experimental result of adjusting only the parameter of the PQC, that is, q; line 83 represents an experimental result of adjusting only the parameter of the neural network, that is, n; line 84 represents an experimental result of adjusting the parameter of the quantum circuit and the parameter of the neural network, that is, q+n; line 85 represents an experimental result of adjusting the parameter of the neural network and the weight parameter, that is, n+t; and line 86 represents an experimental result of adjusting the parameter of the PQC, the parameter of the neural network, and the weight parameter, that is, triple optimization, q+n+t. It can be learned that the pure classic QEM of n+t can be achieved by biased retraining, its error correction effect can be close to triple optimization, which has surpassed the performance of existing joint retraining of q+n.

In another exemplary experiment, the solution of VQNHE framework combining adaptive retraining QEM provided in the present disclosure is applied to a Heisenberg model. Considering a Heisenberg model with an open boundary and six grids, the target function adopts a Hamiltonian, and the corresponding Hamiltonian is:

$$\hat{H} = \sum_{i=1}^{n-1} (X_i X_{i+1} + Y_i Y_{i+1} + Z_i Z_{i+1})$$

X, Y, and Z represent Pauli operators. Due to the SU(2) symmetry of the Heisenberg model, a PQC structure formed by an initial state of the Bell pair and a parameterized SWAP gate is adopted to maintain its symmetry and speed up the convergence. For the parameterized Hamiltonian transformation, a geometrically compatible half-layer SWAP gate is also adopted, so as to ensure that the transformed Hamiltonian still has only the Pauli string of polynomial terms.

The SWAP gate is a swap gate for ensuring that the transformed Hamiltonian still has only the Pauli string of polynomial terms.

$$\text{SWAP} = \begin{bmatrix} 1 & 0 & 0 & 0 \\ 0 & 0 & 1 & 0 \\ 0 & 1 & 0 & 0 \\ 0 & 0 & 0 & 1 \end{bmatrix}$$

In addition, complex parameters are used for both the neural network and the parameter transformation (non-unitary), and the noise model still adopts the addition of depolarizing noise after the dual-bit gate of the PQC. The corresponding experimental results for different retraining solutions are shown in FIG. 9.

Figure 9:
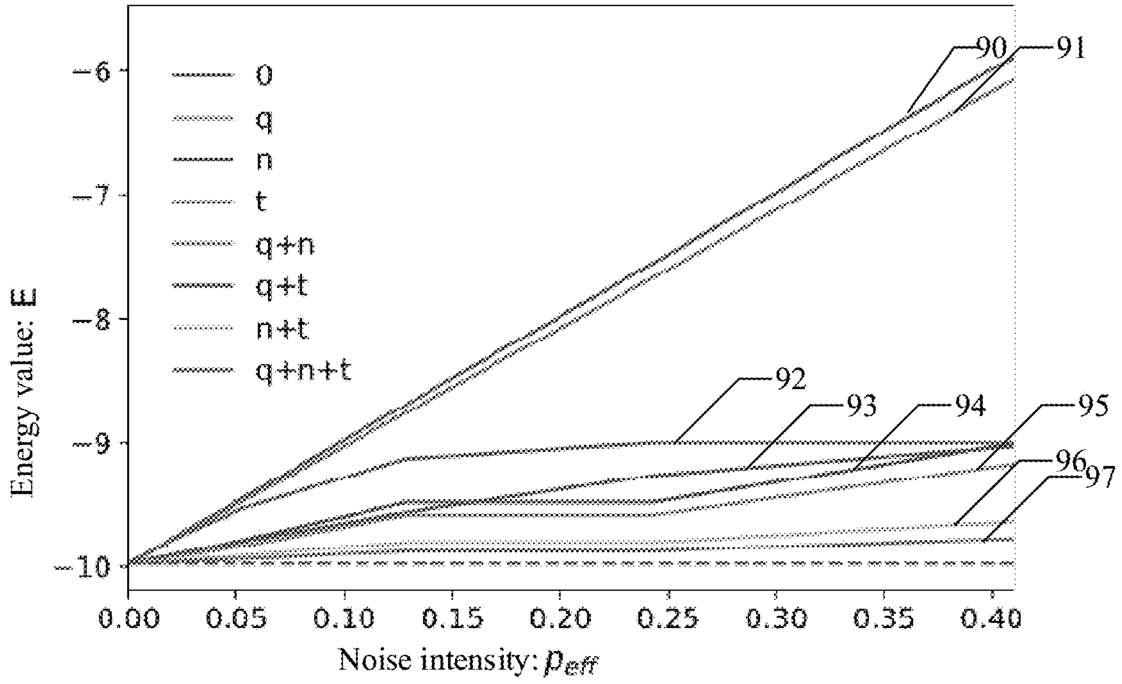
FIG. 9 is a schematic diagram of experimental results according to another embodiment of the present disclosure.

In FIG. 9, q, n, and t represent the PQC, the neural network, and the weight parameter respectively. In FIG. 9, line 90 represents the corresponding energy values of the optimal parameters in the noiseless case under different noise cases; line 91 represents an experimental result of adjusting only the parameter of the PQC, that is, q; line 92 represents an experimental result of adjusting only the weight parameter, that is, t; line 93 represents an experimental result of adjusting the parameter of the PQC and the weight parameter, that is, q+t; line 94 represents an experimental result of adjusting only the parameter of the neural network, that is, n; line 95 represents an experimental result of adjusting the parameter of the PQC and the parameter of the neural network, that is, joint retraining, q+n; line 96 represents an experimental result of adjusting the parameter of the neural network and the weight parameter, that is, n+t; and line 97 represents an experimental result of adjusting the parameter of the PQC, the parameter of the neural network, and the weight parameter, that is, triple optimization, q+n+t. It can be learned that the pure classic QEM of n+t can be achieved by biased retraining, its error correction effect can be close to triple optimization, which has surpassed performance of the conventional joint retraining of q+n.

In FIG. 8 and FIG. 9, it is proved by experiments that the QEM solution corresponding to VQNHE has a very efficient error correction effect, and this feature is unique to VQNHE. For energy estimation, after neural network post-processing is added, a significant improvement over standard VQE estimation can be achieved on noisy quantum hardware. The triple optimization framework of parameterized Hamiltonian+VQNHE gives better approximate expression capability and error correction effect than VQNHE.

The following is apparatus and system embodiments of the present disclosure. The apparatus and system embodiments correspond to the foregoing method embodiments, belonging to the same concept. For details that are not described in the apparatus and system embodiments, reference is made to the method embodiments of the present disclosure.

Figure 10:
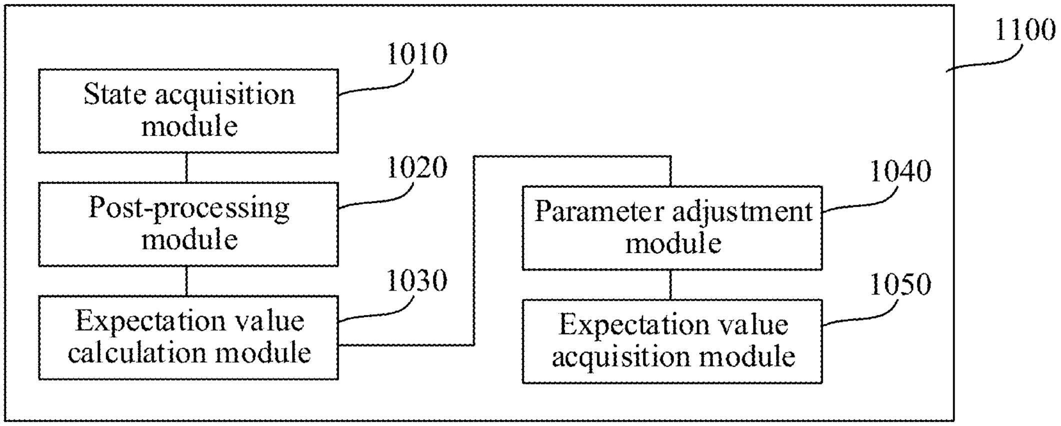
FIG. 10 is a block diagram of an expectation value estimation apparatus in a quantum system according to an embodiment of the present disclosure.

FIG. 10 is a block diagram of a ground state energy estimation apparatus in a quantum system according to an embodiment of the present disclosure. The apparatus has a function of realizing the above method example, and the function may be realized by hardware or by hardware executing corresponding software. The apparatus may be a computer device or may be disposed in a computer device. As shown in FIG. 10, the apparatus 1000 may include: a state acquisition module 1010, a post-processing module 1120, an expectation value calculation module 1030, a parameter adjustment module 1040, and an expectation value acquisition module 1050.

The state acquisition module 1010 is configured to acquire an output quantum state of n qubits, the output quantum states of the n qubits being obtained by an input quantum state of the n qubits through a noisy parameterized quantum circuit (PQC), an expectation value of a target function under the output quantum state of the n qubits being a weighted summation result of expectation values of a plurality of Pauli strings obtained by decomposing the target function, and n being a positive integer.

The post-processing module 1020 is configured to post-process the output quantum state of the n qubits by using a neural network to obtain the expectation values of the plurality of Pauli strings.

The expectation value calculation module 1030 is configured to calculate the expectation value of the target function according to the expectation values of the plurality of Pauli strings, the expectation value of the target function being a result of performing quantum error mitigation (QEM) on noise of the pqc through the neural network.

The parameter adjustment module 1040 is configured to adjust a parameter of a target object until the expectation value of the target function converges, the target object including the neural network.

The expectation value acquisition module 1050 is configured to acquire, when the expectation value of the target function satisfies a convergence condition, a convergent expectation value of the target function, the convergent expectation value being an expectation value that satisfies the convergence condition.

In some embodiments, the target function is a parameterized target function, and the parameterized target function is a target function obtained by performing parameter transformation on an original target function, the parameterized target function and the original target function having a same convergent expectation value.

In some embodiments, the parameterized target function is a target function obtained by performing unitary transformation on the original target function; or, the parameterized target function is a target function obtained by performing non-unitary transformation on the original target function.

In some embodiments, the expectation value calculation module 1030 is configured to perform weighted summation on the expectation values of the plurality of Pauli strings according to weight values corresponding to the plurality of Pauli strings respectively to obtain the expectation value of the target function.

In some embodiments, the parameter adjustment module 1040 is further configured to adjust a weight parameter until the expectation value of the target function converges, the weight parameter being used for calculating the weight values corresponding to the plurality of Pauli strings respectively.

In some embodiments, the parameter adjustment module 1040 is further configured to calculate a first derivative, the first derivative being a derivative of the expectation value of the target function relative to the weight parameter; and adjust the weight parameter by gradient descent based on the first derivative, so that the expectation value of the target function converges.

In some embodiments, the post-processing module 1020 is configured to:

acquire a measurement result corresponding to the output quantum state of the n qubits;

process the measurement result through the neural network to obtain an output result of the neural network; and perform calculation based on the output result of the neural network to obtain the expectation values of the plurality of Pauli strings, the same measurement result being inputted to the neural network before and after parameter adjustment of the neural network.

In some embodiments, the target object further includes the PQC.

In some embodiments, the parameter adjustment module 1040 is configured to:

calculate a second derivative and a third derivative, the second derivative being a derivative of the expectation value of the target function relative to a parameter of the PQC, and the third derivative being a derivative of the expectation value of the target function relative to a parameter of the neural network; and adjust the parameter of the PQC and the parameter of the neural network respectively by gradient descent based on the second derivative and the third derivative, so that the expectation value of the target function converges.

An exemplary embodiment of the present disclosure also provides an expectation value estimation system in a quantum system. The system may include: a noisy PQC, a post-processing module, and an optimizer.

The PQC is configured to transform an input quantum state of n qubits to obtain an output quantum state of the n qubits, an expectation value of a target function under the output quantum state of the n qubits being a weighted summation result of expectation values of a plurality of Pauli strings obtained by decomposing the target function, and n being a positive integer.

The post-processing module is configured to post-process the output quantum state of the n qubits by using a neural network to obtain the expectation values of the plurality of Pauli strings; and calculate the expectation value of the target function according to the expectation values of the plurality of Pauli strings, the expectation value of the target function being a result of performing quantum error mitigation (QEM) on noise of the pqc through the neural network.

The optimizer is configured to adjust a parameter of a target object until the expectation value of the target function converges, the target object including the neural network; and acquire, when the expectation value of the target function satisfies a convergence condition, a convergent expectation value of the target function, the convergent expectation value being an expectation value that satisfies the convergence condition.

In some embodiments, the target function is a parameterized target function, and the parameterized target function is a target function obtained by performing parameter transformation on an original target function, the parameterized target function and the original target function having a same convergent expectation value.

In some embodiments, the parameterized target function is a target function obtained by performing unitary transformation on the original target function.

In some embodiments, the parameterized target function is a target function obtained by performing non-unitary transformation on the original target function.

In some embodiments, the post-processing module is configured to perform weighted summation on the expectation values of the plurality of Pauli strings according to weight values corresponding to the plurality of Pauli strings respectively to obtain the expectation value of the target function.

In some embodiments, the optimizer is further configured to adjust a weight parameter until the expectation value of the target function converges, the weight parameter being used for calculating the weight values corresponding to the plurality of Pauli strings respectively.

In some embodiments, the optimizer is configured to:

calculate a first derivative, the first derivative being a derivative of the expectation value of the target function relative to the weight parameter; and adjust the weight parameter by gradient descent based on the first derivative, so that the expectation value of the target function converges.

In some embodiments, the post-processing module is configured to:

acquire a measurement result corresponding to the output quantum state of the n qubits;

process the measurement result through the neural network to obtain an output result of the neural network; and perform calculation based on the output result of the neural network to obtain the expectation values of the plurality of Pauli strings, the same measurement result being inputted to the neural network before and after parameter adjustment of the neural network.

In some embodiments, the target object further includes the PQC.

In some embodiments, the optimizer is configured to:

calculate a second derivative and a third derivative, the second derivative being a derivative of the expectation value of the target function relative to a parameter of the PQC, and the third derivative being a derivative of the expectation value of the target function relative to a parameter of the neural network; and adjust the parameter of the PQC and the parameter of the neural network respectively by gradient descent based on the second derivative and the third derivative, so that the expectation value of the target function converges.

When the apparatus and system provided in the foregoing embodiments implement functions of the apparatus and system, the division of the foregoing functional modules is merely an example for description. In the practical application, the functions may be assigned to and completed by different functional modules according to the requirements, that is, the internal structure of the device is divided into different functional modules, to implement all or some of the functions described above. In addition, the apparatus and system provided in the foregoing embodiments belong to the same conception as the method embodiments. For the specific implementation process, reference may be made to the method embodiments, and details are not described herein again.

Figure 11:
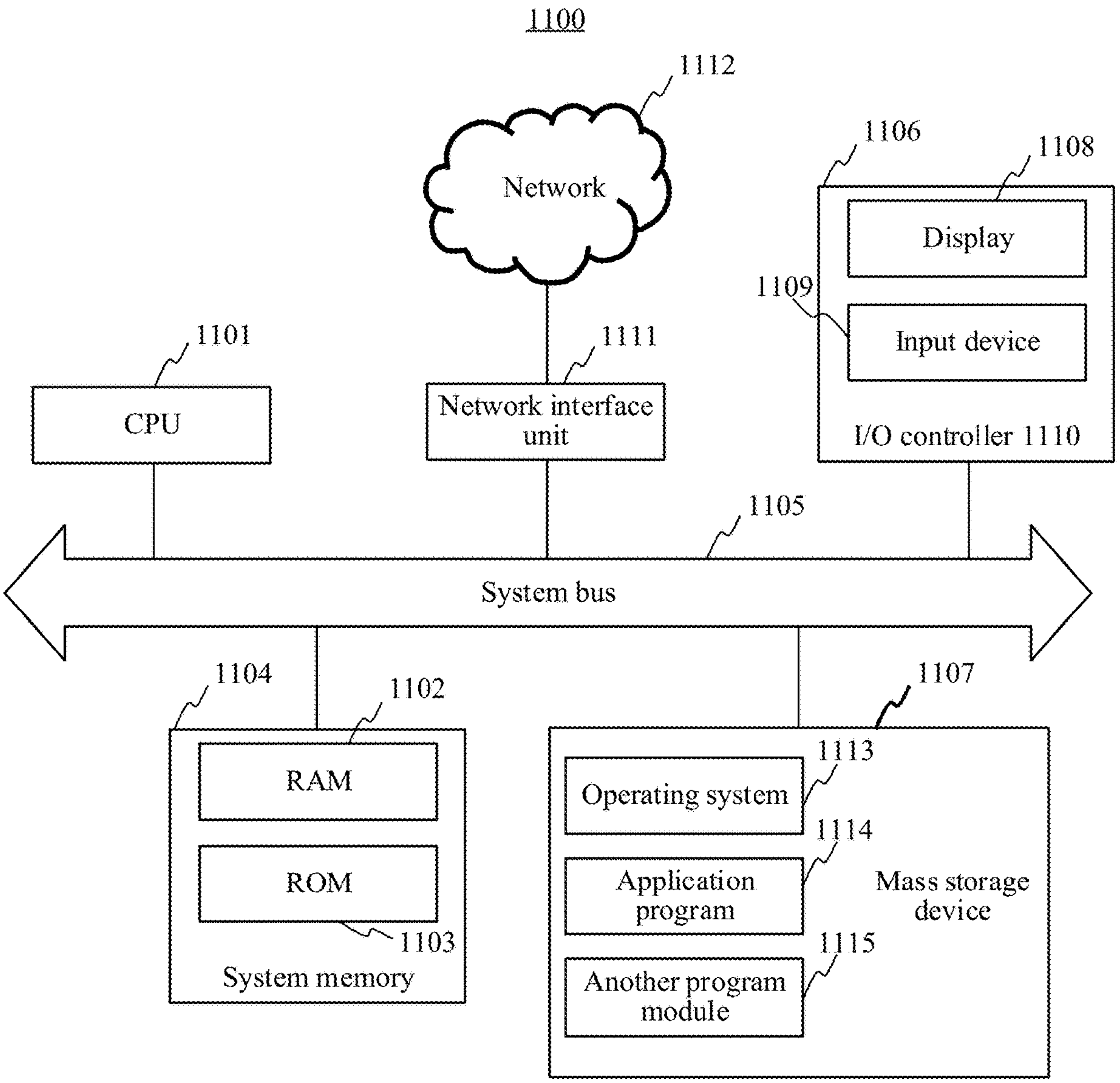
FIG. 11 is a schematic structural diagram of a computer device according to an embodiment of the present disclosure.

FIG. 11 is a schematic structural diagram of a computer device according to an embodiment of the present disclosure. The computer device may be any electronic device that has data storage and computing capabilities. The computer device may be configured to implement the expectation value estimation method in a quantum system provided in the foregoing embodiments. Specifically:

the computer device 1100 includes a central processing unit (such as a CPU, a graphics processing unit (GPU), and a field programmable gate array (FPGA)) 1101, a system memory 1104 including a random-access memory (RAM) 1102 and a read-only memory (ROM) 1103, and a system bus 1105 connecting the system memory 1104 and the central processing unit 1101. The computer device 1100 further includes a basic input/output (I/O) system 1106 assisting in transmitting information between components in a server, and a mass storage device 1107 configured to store an operating system 1113, an application program 1114, and another program module 1115.

In some embodiments, the basic I/O system 1106 includes a display 1108 configured to display information and an input device 1109, such as a mouse or a keyboard, configured to input information for a user. The display 1108 and the input device 1109 are both connected to the central processing unit 1101 by using an input/output (I/O) controller 1110 connected to the system bus 1105. The basic I/O system 1106 may further include the I/O controller 1110 configured to receive and process inputs from a plurality of other devices such as a keyboard, a mouse, or an electronic stylus. Similarly, the I/O controller 1110 further provides output to a display screen, a printer, or other types of output devices.

The mass storage device 1107 is connected to the central processing unit 1101 by using a mass storage controller (not shown) connected to the system bus 1105. The mass storage device 1107 and an associated computer-readable medium provide non-volatile storage for the computer device 1100. That is, the mass storage device 1107 may include a computer-readable medium (not shown) such as a hard disk or a compact disc ROM (CD-ROM) drive.

Without loss of generality, the computer-readable medium may include a computer storage medium and a communication medium. The computer storage medium includes volatile and non-volatile, removable and non-removable media that are configured to store information such as computer-readable instructions, data structures, program modules, or other data and that are implemented by using any method or technology. The computer storage medium includes a RAM, a ROM, an erasable programmable ROM (EPROM), an electrically erasable programmable ROM (EEPROM), a flash memory or another solid-state memory technology, a CD-ROM, a digital video disc (DVD) or another optical memory, a tape cartridge, a magnetic cassette, a magnetic disk memory, or another magnetic storage device. Certainly, a person skilled in the art can know that the computer storage medium is not limited to the foregoing several types. The foregoing system memory 1104 and mass storage device 1107 may be collectively referred to as a memory.

According to the embodiments of the present disclosure, the computer device 1100 may be further connected, through a network such as the Internet, to a remote computer on the network and run. That is, the computer device 1100 may be connected to a network 1112 by using a network interface unit 1111 connected to the system bus 1105, or may be connected to another type of network or a remote computer system (not shown) by using the network interface unit 1111.

The memory further includes a computer program. The computer program is stored in the memory and configured to be executed by one or more processors, to implement the expectation value estimation method in a quantum system.

An exemplary embodiment of the present disclosure also provides a computer device. The computer device is configured to perform the expectation value estimation method in a quantum system.

That is, the expectation value estimation method in a quantum system provided in the present disclosure may be performed by the computer device. The computer device may be a hybrid device environment of classical computer and quantum computer. For example, the method is performed by the cooperation of a classical computer and a quantum computer. In the hybrid device environment of classical computer and quantum computer, the classical computer executes a computer program to implement some classical calculations and control the quantum computer, and the quantum computer implements the control and measurement of qubits. For example, the PQC and measurement circuit may be configured in the quantum computer. The classical computer executes a computer program to control the quantum computer to process an input quantum state of n qubits through the PQC and perform transformation corresponding to Pauli strings on an output quantum state of the n qubits through the measurement circuit. In addition, the classical computer may also execute a computer program to implement some classical calculations, such as post-processing the output quantum state of the n qubits by using a neural network to obtain expectation values of a plurality of Pauli strings, calculating an expectation value of a target function according to the expectation values of the plurality of Pauli strings, adjusting a parameter of a target object until the expectation value of the target function converges, and acquiring, when the expectation value of the target function satisfies a convergence condition, a convergent expectation value of the target function.

In some embodiments, the computer device may be a single classical computer, that is, steps of the expectation value estimation method in a quantum system provided in the present disclosure are performed by the classical computer, for example, the classical computer executes a computer program to implement the method; or, the computer device may be a single quantum computer, that is, steps of the expectation value estimation method in a quantum system provided in the present disclosure are performed by the quantum computer. This is not limited in the present disclosure.

An exemplary embodiment of the present disclosure also provides a computer-readable storage medium. The storage medium stores a computer program. The computer program, when executed by a processor of the computer device, implements the expectation value estimation method in a quantum system.

In some embodiments, the computer-readable storage medium may include: a ROM, a RAM, a solid state drive (SSD), an optical disc, or the like. The RAM may include a resistance random access memory (ReRAM) and a dynamic random access memory (DRAM).

An exemplary embodiment of the present disclosure also provides a computer program product or a computer program. The computer program product or the computer program includes a computer instruction. The computer instruction is stored in a computer-readable storage medium. A processor of a computer device reads the computer instruction from the computer-readable storage medium and executes the computer instruction to cause the computer device to perform the expectation value estimation method in a quantum system.

It is to be understood that "plurality of" mentioned in this specification means two or more. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. In addition, the step numbers described in this specification merely schematically show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of the present disclosure.

The foregoing descriptions are merely exemplary embodiments of the present disclosure, but are not intended to limit the present disclosure. Any modification, equivalent replacement, or improvement made within the spirit and principle of the present disclosure shall fall within the protection scope of the present disclosure.

What is claimed is:

1. An expectation value estimation method for a quantum system, performed by a computer device, the method comprising:

acquiring an output quantum state of n qubits, the output quantum states of the n qubits being obtained by an input quantum state of the n qubits through a noisy parameterized quantum circuit (PQC), n being a positive integer;

acquiring a measurement result corresponding to the output quantum state of the n qubits, the measurement result comprising a plurality of bit strings obtained by measuring the n qubits in measurement bases corresponding to respective Pauli strings of a decomposition of a target function; and performing quantum error mitigation (QEM) on noise of the PQC, comprising:

post-processing the measurement result by using a neural network configured to output, for each Pauli string of the decomposition, a corresponding estimated expectation value, to obtain expectation values of a plurality of Pauli strings, the plurality of Pauli strings being obtained by decomposing the target function;

calculating an expectation value of the target function under the output quantum state of the n qubits according to the expectation values of the plurality of Pauli strings;

adjusting a parameter of a target object until the expectation value of the target function converges, the target object comprising the neural network, wherein while adjusting parameters of the neural network, no additional executions of the PQC are performed and the same recorded measurement result is re-used before and after the parameter adjustment; and acquiring, when the expectation value of the target function satisfies a convergence condition, a convergent expectation value of the target function, the convergent expectation value being an expectation value that satisfies the convergence condition.

2. The method according to claim 1, wherein the target function is a parameterized target function, and the parameterized target function is a target function obtained by performing parameter transformation on an original target function, the parameterized target function and the original target function having a same convergent expectation value.

3. The method according to claim 2, wherein the parameterized target function is a target function obtained by performing unitary transformation on the original target function.

4. The method according to claim 2, wherein the parameterized target function is a target function obtained by performing non-unitary transformation on the original target function.

5. The method according to claim 1, wherein the calculating the expectation value of the target function under the output quantum state of the n qubits according to the expectation values of the plurality of Pauli strings comprises:

performing weighted summation on the expectation values of the plurality of Pauli strings according to weight values corresponding to the plurality of Pauli strings to obtain the expectation value of the target function, each of the plurality of Pauli strings corresponding to a respective weight value of the weight values.

6. The method according to claim 5, further comprising:

adjusting a weight parameter until the expectation value of the target function converges, the weight parameter being used for calculating the weight values corresponding to the plurality of Pauli strings.

7. The method according to claim 6, wherein the adjusting the weight parameter until the expectation value of the target function converges comprises:

calculating a first derivative, the first derivative being a derivative of the expectation value of the target function relative to the weight parameter; and adjusting the weight parameter by gradient descent based on the first derivative, so that the expectation value of the target function converges.

8. The method according to claim 1, wherein the post-processing the output quantum state of the n qubits by using the neural network to obtain the expectation values of the plurality of Pauli strings comprises:

processing the measurement result through the neural network to obtain an output result of the neural network; and performing calculation based on the output result of the neural network to obtain the expectation values of the plurality of Pauli strings.

9. The method according to claim 1, wherein the target object further comprises the PQC.

10. The method according to claim 9, wherein the adjusting the parameter of the target object until the expectation value of the target function converges comprises:

calculating a second derivative and a third derivative, the second derivative being a derivative of the expectation value of the target function relative to a parameter of the PQC, and the third derivative being a derivative of the expectation value of the target function relative to a parameter of the neural network; and adjusting the parameter of the PQC and the parameter of the neural network respectively by gradient descent based on the second derivative and the third derivative, so that the expectation value of the target function converges.

11. An expectation value estimation apparatus for a quantum system, comprising:

a processor and a memory, the memory storing a computer program, the computer program being loaded and executed by the processor to implement:

acquiring an output quantum state of n qubits, the output quantum states of the n qubits being obtained by an input quantum state of the n qubits through a noisy parameterized quantum circuit (PQC), n being a positive integer;

acquiring a measurement result corresponding to the output quantum state of the n qubits, the measurement result comprising a plurality of bit strings obtained by measuring the n qubits in measurement bases corresponding to respective Pauli strings of a decomposition of a target function; and performing quantum error mitigation (QEM) on noise of the PQC, comprising:

post-processing the measurement result by using a neural network configured to output, for each Pauli string of the decomposition, a corresponding estimated expectation value, to obtain expectation values of a plurality of Pauli strings, the plurality of Pauli strings being obtained by decomposing the target function;

calculating an expectation value of the target function under the output quantum state of the n qubits according to the expectation values of the plurality of Pauli strings;

adjusting a parameter of a target object until the expectation value of the target function converges, the target object comprising the neural network, wherein while adjusting parameters of the neural network, no additional executions of the PQC are performed and the same recorded measurement result is re-used before and after the parameter adjustment; and acquiring, when the expectation value of the target function satisfies a convergence condition, a convergent expectation value of the target function, the convergent expectation value being an expectation value that satisfies the convergence condition.

12. The apparatus according to claim 11, wherein the target function is a parameterized target function, and the parameterized target function is a target function obtained by performing parameter transformation on an original target function, the parameterized target function and the original target function having a same convergent expectation value.

13. The apparatus according to claim 12, wherein
- the parameterized target function is a target function obtained by performing unitary transformation on the original target function; or,
- the parameterized target function is a target function obtained by performing non-unitary transformation on the original target function.

14. The apparatus according to claim 11, wherein the calculating the expectation value of the target function under the output quantum state of the n qubits according to the expectation values of the plurality of Pauli strings comprises:
- performing weighted summation on the expectation values of the plurality of Pauli strings according to weight values corresponding to the plurality of Pauli strings to obtain the expectation value of the target function, each of the plurality of Pauli strings corresponding to a respective weight value of the weight values.

15. The apparatus according to claim 14, wherein the processor is further configured to perform:
- adjusting a weight parameter until the expectation value of the target function converges, the weight parameter being used for calculating the weight values corresponding to the plurality of Pauli strings.

16. The apparatus according to claim 15, wherein the adjusting the weight parameter until the expectation value of the target function converges comprises:
- calculating a first derivative, the first derivative being a derivative of the expectation value of the target function relative to the weight parameter; and
- adjusting the weight parameter by gradient descent based on the first derivative, so that the expectation value of the target function converges.

17. The apparatus according to claim 11, wherein the post-processing the output quantum state of the n qubits by using the neural network to obtain the expectation values of the plurality of Pauli strings comprises:
- processing the measurement result through the neural network to obtain an output result of the neural network; and
- performing calculation based on the output result of the neural network to obtain the expectation values of the plurality of Pauli strings.

18. The apparatus according to claim 11, wherein the target object further comprises the PQC.

19. The apparatus according to claim 18, wherein the adjusting the parameter of the target object until the expectation value of the target function converges comprises:
- calculating a second derivative and a third derivative, the second derivative being a derivative of the expectation value of the target function relative to a parameter of the PQC, and the third derivative being a derivative of the expectation value of the target function relative to a parameter of the neural network; and
- adjusting the parameter of the PQC and the parameter of the neural network respectively by gradient descent based on the second derivative and the third derivative, so that the expectation value of the target function converges.

20. A non-transitory computer-readable storage medium, storing a computer program, the computer program being loaded and executed by a processor to implement:
- acquiring an output quantum state of n qubits, the output quantum states of the n qubits being obtained by an input quantum state of the n qubits through a noisy parameterized quantum circuit (PQC), n being a positive integer;
- acquiring a measurement result corresponding to the output quantum state of the n qubits, the measurement result comprising a plurality of bit strings obtained by measuring the n qubits in measurement bases corresponding to respective Pauli strings of a decomposition of a target function; and
- performing quantum error mitigation (QEM) on noise of the PQC, comprising:
  - post-processing the measurement result by using a neural network configured to output, for each Pauli string of the decomposition, a corresponding estimated expectation value, to obtain expectation values of a plurality of Pauli strings, the plurality of Pauli strings being obtained by decomposing the target function;
  - calculating an expectation value of the target function under the output quantum state of the n qubits according to the expectation values of the plurality of Pauli strings;
  - adjusting a parameter of a target object until the expectation value of the target function converges, the target object comprising the neural network, wherein while adjusting parameters of the neural network, no additional executions of the PQC are performed and the same recorded measurement result is re-used before and after the parameter adjustment; and
- acquiring, when the expectation value of the target function satisfies a convergence condition, a convergent expectation value of the target function, the convergent expectation value being an expectation value that satisfies the convergence condition.

* * * * *